US012278546B2

(12) United States Patent
Whittaker et al.

(10) Patent No.: US 12,278,546 B2
(45) Date of Patent: Apr. 15, 2025

(54) HEAT PUMP SYSTEM AND A METHOD OF OPERATING A HEAT PUMP SYSTEM

(71) Applicant: WHITTAKER ENGINEERING (STONE-HAVEN) LIMITED, Aberdeenshire (GB)

(72) Inventors: Kenneth Whittaker, Aberdeenshire (GB); Keith Graham Watt, Aberdeenshire (GB); Matthias Graessner, Aberdeenshire (GB)

(73) Assignee: WHITAKER ENGINEERING (STONEHAVEN) LIMITED, Aberdeenshire (GB)

( * ) Notice: Subject to any disclaimer, the term of this patent is extended or adjusted under 35 U.S.C. 154(b) by 0 days.

(21) Appl. No.: 18/577,930

(22) PCT Filed: Jul. 8, 2022

(86) PCT No.: PCT/GB2022/051772
§ 371 (c)(1),
(2) Date: Jan. 9, 2024

(87) PCT Pub. No.: WO2023/281277
PCT Pub. Date: Jan. 12, 2023

(65) Prior Publication Data
US 2024/0333096 A1 Oct. 3, 2024

(30) Foreign Application Priority Data
Jul. 9, 2021 (GB) ..................................... 2109915

(51) Int. Cl.
*H02K 7/18* (2006.01)
*F25B 9/14* (2006.01)
(52) U.S. Cl.
CPC ............. *H02K 7/1823* (2013.01); *F25B 9/14* (2013.01)

(58) Field of Classification Search
CPC ................................ H02K 7/1823; F25B 9/14
See application file for complete search history.

(56) References Cited

U.S. PATENT DOCUMENTS

| 1,729,242 A | * | 9/1929 | Louis ...................... F01C 1/067 |
| | | | 123/43 B |
| 1,944,875 A | * | 1/1934 | Bullington .............. F02B 53/00 |
| | | | 277/357 |

(Continued)

FOREIGN PATENT DOCUMENTS

| CA | 2926683 A1 | * | 8/2015 | ................ F01B 7/16 |
| CN | 110926059 A | | 3/2020 | |

(Continued)

OTHER PUBLICATIONS

"Ed Miliband reveals plan to prevent net zero blackouts", The Telegraph, Business; https://www.telegraph.co.uk/business/2024/10/02/giant-flywheels-to-be-installed-in-britains-grid-blackouts/ (Year: 2024).*

(Continued)

*Primary Examiner* — Pedro J Cuevas
(74) *Attorney, Agent, or Firm* — HUNTON ANDREWS KURTH LLP

(57) ABSTRACT

A heat pump system includes a regenerative thermal machine (1\*, **1\*\*, 1\*\*\*) in fluid communication with one or more heat reservoirs (21; 31), wherein the regenerative thermal machine (1, 1\*\*, 1\*\*\*) comprises working fluid compression (12) and expansion (11) spaces; and an electrical machine (130) that is electrically connectable via interconnector (3) to an electricity distribution grid (2); characterised in that the regenerative thermal machine (1\*, 1\*\*, 1\*\*\*) further comprises a phase change means (160**) operable to change the phase relationship between the said (Continued)

working fluid compression (12) and expansion spaces (11) of the regenerative thermal machine (1*, **1\*\*, 1\*\*\***).

31 Claims, 11 Drawing Sheets

(56) References Cited

U.S. PATENT DOCUMENTS

| | | | | |
|---|---|---|---|---|
| 3,823,559 | A * | 7/1974 | Foret | F28D 11/02 62/401 |
| 4,009,573 | A * | 3/1977 | Satz | F02G 1/043 418/8 |
| 4,138,847 | A * | 2/1979 | Hill | F25B 9/14 60/519 |
| 4,395,880 | A | 8/1983 | Berchowitz | |
| 4,642,988 | A * | 2/1987 | Benson | F02G 1/0435 60/659 |
| 6,470,683 | B1 * | 10/2002 | Childs | B01D 61/12 60/39.6 |
| 7,076,941 | B1 * | 7/2006 | Hoffman | F02G 1/0435 60/517 |
| 7,762,055 | B2 * | 7/2010 | Hoffman | F28F 7/02 60/517 |
| 7,823,381 | B2 * | 11/2010 | Misselhorn | F02G 1/0435 60/520 |
| 8,037,861 | B2 * | 10/2011 | Liang | F01C 1/073 123/43 B |
| 8,210,151 | B2 * | 7/2012 | Drachko | F01C 1/07 123/243 |
| 8,511,277 | B2 * | 8/2013 | Drachko | F01C 19/12 123/243 |
| 9,476,648 | B2 * | 10/2016 | Sun | F28C 1/14 |
| 9,845,711 | B2 * | 12/2017 | Ernst | F01K 25/06 |
| 10,770,996 | B1 * | 9/2020 | Waun | H02P 23/14 |
| 10,890,383 | B2 * | 1/2021 | Sun | F28C 1/14 |
| 11,125,184 | B2 * | 9/2021 | Notarnicola | F02G 1/043 |
| 11,296,628 | B2 * | 4/2022 | Waun | F02G 1/045 |
| 11,608,795 | B2 * | 3/2023 | Notarnicola | F28F 7/02 |
| 11,976,610 | B2 * | 5/2024 | Notarnicola | F23K 5/20 |
| 2002/0124561 | A1 * | 9/2002 | Ban | H10N 15/20 60/517 |
| 2004/0093864 | A1 | 5/2004 | Bassett | |
| 2007/0095064 | A1 * | 5/2007 | Hoffman | F28D 17/02 60/620 |
| 2009/0272111 | A1 | 11/2009 | Makoto | |
| 2010/0329903 | A1 * | 12/2010 | Fong | F15B 1/265 137/12 |
| 2011/0000206 | A1 * | 1/2011 | Aprad | F24V 99/00 165/45 |
| 2011/0115223 | A1 * | 5/2011 | Stahlkopf | H02P 9/04 290/7 |
| 2013/0042607 | A1 | 2/2013 | Berchowitz | |
| 2013/0104533 | A1 | 5/2013 | Fong | |
| 2015/0143806 | A1 | 5/2015 | Friesth | |
| 2018/0179917 | A1 | 6/2018 | Apte | |
| 2020/0025420 | A1 | 1/2020 | Makoto et al. | |
| 2020/0284148 | A1 * | 9/2020 | Binder | F04B 35/002 |
| 2024/0183344 | A1 * | 6/2024 | Zhang | F04B 1/34 |

FOREIGN PATENT DOCUMENTS

| | | |
|---|---|---|
| DE | 10305128 A1 | 8/2003 |
| DE | 10300591 A1 | 4/2004 |
| FR | 2977273 A1 | 10/2013 |
| JP | 2007107736 A | 4/2007 |
| WO | 199404878 A1 | 3/1994 |
| WO | 2009138724 A2 | 11/2009 |
| WO | 20140135895 A1 | 9/2014 |

OTHER PUBLICATIONS

Combined Search and Examination report under Sections 17 & 18(3) dated Jul. 10, 2023 issued in GB2210061.4.
Notification of Grant dated May 23, 2023 received in GB2608709.
Patents Act 1977: Search Report under Section 17 dated Aug. 25, 2022 issued in GB2210061.4.
Letter in response to the Communication under section 18(3) dated Aug. 26, 2022 submitted in GB2210061.4.
International Search Report and Written Opinion dated Sep. 27, 2022 issued in PCT/GB22/051772.
Combined Search and Examination Report under Sections 17 & 18(3) dated Sep. 7, 2021 issued in GB2109915.5.

* cited by examiner

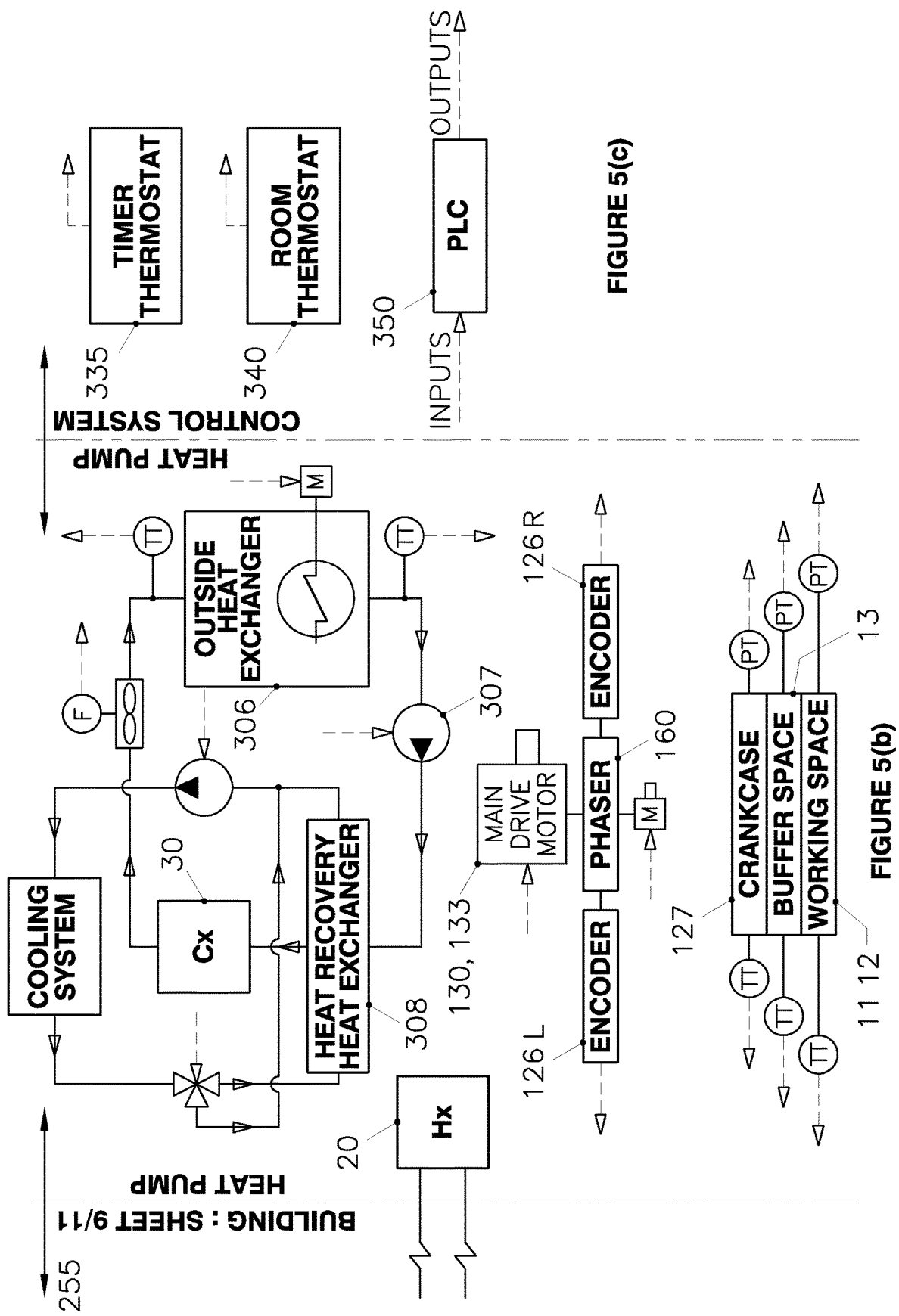

HEAT PUMP SYSTEM AND A METHOD OF OPERATING A HEAT PUMP SYSTEM

The present invention relates to a heat pump system incorporating a thermodynamic machine which preferably utilises the Stirling Cycle and which is usable as a heat pump and is optionally interchangeably usable as a heat pump and a heat engine, and an electricity distribution grid ancillary service support system comprising one or more of such heat pump systems, and preferably many of such heat pump systems aggregated throughout the electricity distribution grid.

BACKGROUND TO THE INVENTION

In order to fulfil commitment made upon signing the Paris Climate Agreement, many countries have set the ambitious target of reducing carbon dioxide emissions to 'net-zero' by 2050. To achieve 'net-zero' carbon dioxide emissions will involve fundamental changes to current means of generating and distributing electricity, heating homes and providing transportation. The greatest change can be considered to be the wholesale 'decarbonisation' of electricity generation, heating and transportation systems. As a result, electricity generation must evolve to become predominantly renewable, fossil fuelled boilers must be replaced by heat pumps and internal combustion engines in vehicles replaced with electric power. For example, it is planned that no gas boilers will be installed in new-build homes in the United Kingdom after 2025.

However, a problem that is rarely discussed is that with increasing penetration of renewable technologies such as wind turbines and solar photovoltaic panels, electrical grids, for example the National Gird in the United Kingdom, are likely to become increasingly unstable. The loss of fossil-fuel power generation in itself is not the issue, but rather the loss of the associated large rotating machines will inevitably reduce the stability of future electricity networks. This is because traditional generators store kinetic energy in their rotating mass and this means of energy storage (often referred to as inertia) will be reduced as renewables penetration into the electricity grid system increases.

In the event a large electrical load is placed on the distribution system, or if a large generator fails, the resulting imbalance between supply and demand is accommodated by the kinetic energy stored in rotating synchronous generators. In simple terms, the generators slow down slightly, giving up (a typically relatively small portion of) their stored kinetic energy, thus providing sufficient time for back-up systems to respond. Somewhat serendipitously, this type of energy storage provides a valuable advantage over to battery-based fast frequency response storage in that it does not depend on fast acting and robust communication systems, but rather is present for whenever it is needed.

Future electricity systems, as currently envisaged, will have very low inertia and this is expected to lead to problems with grid stability and resilience. Electrical Systems Operators (ESOs) must therefore solve this problem if penetration of renewable generation is to continue to increase in line with government commitments.

High-inertia rotating stabilizer synchronous machines have been developed to help overcome the problem of instability in electrical grid networks. Rotating stabilizers can help stabilize frequency deviations by generating and absorbing reactive power and maintain grid performance by replicating the synchronous inertia response provided by traditional thermal power generation means such as coal or gas power plants. Manufactures of such stabilisers include GE Power Conversion.

Energy converters utilising the Stirling Cycle (typically called "Stirling cycle machines") are also well known and come in various configurations. A typical so called "alpha" type Stirling cycle machine has two pistons reciprocating within respective cylinders.

The cylinders are connected by a passage or network of passages accommodating three heat exchangers. The first (hot) heat exchanger is connected to a hot (typically hotter) reservoir, whilst the second (cold) heat exchanger is connected to a cold (typically colder) reservoir. The third heat exchanger, known as a regenerator, is located between said hot and cold heat exchangers. The pistons are both connected to a crankshaft and flywheel via a connecting rod and, possibly, a cross-head. A working fluid of constant mass, typically gas, is hermetically contained within the cylinders, connecting passages and the said three heat exchangers. One cylinder, also known as the hot cylinder or expansion cylinder[1], is in fluid communication with the hot heat exchanger which heats the gas (adds heat). The other cylinder, also known as the cold cylinder or compression cylinder, is in fluid communication with the cold heat exchanger which cools the gas (extracts heat). The working fluid is cycled back and forth between the expansion cylinder and the compression cylinder, passing through the regenerator twice per cycle, whilst the regenerator alternately absorbs heat from, and releases heat to, the working fluid.

[1] This is correct for a Stirling cycle machine in engine mode-when the Stirling cycle machine is in heat pump mode, the expansion cylinder is the cold cylinder and the compression cylinder becomes the hot cylinder.

The above description of the two pistons, respective cylinders and network of tubes etc. of course describes the "alpha" type Stirling cycle machine when in engine mode such that there is a net conversion of heat energy to mechanical work that is output from the Stirling cycle machine by a rotary output shaft.

However, the Stirling cycle machine can also be run in heat pump mode such that there is a net conversion of mechanical work (input into the Stirling cycle machine via the rotary shaft) into heat energy, in which case many of the descriptions are reversed e.g. the compression cylinder becomes the hot cylinder and the expansion cylinder becomes the cold cylinder.

For example, when in engine mode, the addition and extraction of heat in the heat exchangers, and the action of the regenerator, create compression and expansion of the working fluid that moves the pistons in the cylinders, thereby causing the pistons in the chambers to reciprocate and to drive the crankshaft, which can provide work output in the form of rotational power. The regenerator retains a portion of the heat remaining in the working fluid after expansion, and returns it to the working fluid as passes back through the regenerator towards the hot heat exchanger. The regenerator thus recycles heat that would otherwise be lost through the cold heat exchanger and therefore increases the thermal efficiency of a Stirling cycle machine compared to other hot air engines. This part of the Stirling cycle is known as "regeneration".

Other types of a Stirling cycle machine include so called "beta" and "gamma" types, which differ from the "alpha" type structurally, but operate under the same principle. A detailed discussion of the functioning of conventional Stirling cycle machines is set forth in the book "Stirling Engines" by Graham Walker, Clarendon Press, 1980, the disclosure of which is incorporated herein by reference.

An attractive aspect of a Stirling cycle machine nowadays is that it can be powered by practically any source of heat, including renewable energy sources such as heat derived from renewable sources, such as wind, geothermal and solar. One example of the use of a Stirling cycle heat pump is by Olvondo Technology AS of Norway (https:///www.olvondo-tech.no) (aka Single Phase Power AS of Norway).

Another attractive aspect of a Stirling cycle machine is the ability to run 'in reverse' to pump heat from a cold source to a hot source.

At the same time, a Stirling cycle machine has several further advantageous features including that it produces no atmospheric emissions and works with minimal noise. Examples of modern, high efficiency Stirling cycle machines are described in WO2014/135895A1 to Whittaker Engineering (Stonehaven) Limited, the disclosure of which is incorporated herein by reference.

FR2977273 discloses a Stirling cycle machine in which the power can be varied by throttling through adjustment of the phase angle between the power piston and the displacer piston through a differential-type mechanism located in the crankshaft.

The technical paper "Mechanical Design of the 4-500 $KW_{TH}$ Stirling Cycle Heat Pump SPP 4-16" by HØEG et al. (Proceedings of the $17^{th}$ International Stirling Cycle Machine Conference, Northumbria University, 2016, pp 21-33) discuss the mechanical design of Stirling cycle heat pumps that may be coupled to induction electrical motors and which are used to supply saturated steam and for using heat from district heating systems as the heat source.

U.S. Pat. No. 4,395,880A describes a Stirling cycle machine for use in a vehicle and which can move seamlessly between 'heat engine' and 'heat pump' modes, by changing the phase angle. The heat pump mode of the disclosed machine was an early attempt at regenerative braking.

DE10305128 discloses a Stirling cycle machine heat engine that is connected to a synchronous motor by a clutch and which drives a synchronous generator at constant RPM in order to produce electrical power for the compressor or a separate refrigerant-based heat pump.

It should be noted that the term "Stirling cycle machine", whilst considered by some persons skilled in the art as meaning a specific type of regenerative thermal machine whereas other persons skilled in the art consider that the term Stirling cycle machine can encompass all different types of regenerative thermal machine. What is accepted by most if not all persons skilled in the art is that the term regenerative thermal machines encompasses all types of regenerative thermal machine including:

a) all types of Stirling cycle machines;
b) other (i.e. non-Stirling cycle machine) piston(s) and cylinder(s) combinations including single acting e.g. Laubereau Schwartzkopff, Heinrici, Rainbow, Robinson, Rider parallel, Rankin Napier, parallel, V cylinder and opposed cylinder types;
c) other (i.e. non-Stirling cycle machine) Piston(s) and cylinder(s) combinations including double acting e.g. Finkelstein and Rinia types;
d) Rotary versions e.g. Rotary Finkelstein and Zwiauer Wankel;
e) Bellows and diaphragm types;
f) Free piston types;
g) Ericsson Engine types;

and as such, the term "regenerative thermal machine" is used herein to encompass all such types of regenerative thermal machine as listed above and also as yet to be invented and which are suitable for use in embodiments in accordance with the present invention.

SUMMARY OF THE INVENTION

In accordance with an aspect of the invention there is provided a heat pump system comprising a regenerative thermal machine in fluid communication with one or more heat reservoirs, wherein the regenerative thermal machine comprises working fluid compression and expansion spaces; and an electrical machine that is electrically connectable to an electricity distribution grid;

characterised in that the regenerative thermal machine further comprises a phase change means operable to change the phase relationship between the said working fluid compression and expansion spaces of the regenerative thermal machine.

Preferably, the phase change means is operable to change the volumetric phase angle between the compression space and the expansion space.

Typically, the regenerative thermal machine comprises an input/output drive end and optionally, the heat pump system further comprises a releasable coupling, wherein the input/drive end is mechanically connectable to the electrical machine via said releasable coupling.

The regenerative thermal machine typically further comprises an input/output drive end that is mechanically connectable to the electrical machine. In some preferred embodiments, the input/output drive end is mechanically connectable to the electrical machine via a releasable coupling. In some other preferred embodiments, the heat pump system further comprises a variable frequency drive device adapted to form at least part of the electrically connection of the electrical machine to the electricity distribution grid and in said other preferred embodiments, the electrical machine is typically an asynchronous electrical motor.

Typically, the heat pump system further comprises a controller adapted to control at least part of and more preferably many and/or all aspects of the heat pump system. Typically, the controller comprises one or more inputs and one or more outputs and preferably can control the operation of the phase change means. The controller is typically configured to receive one or more input signals from said one or more inputs and optionally outputting one or more signals to control one or more components in or aspects of the heat pump system.

Typically the heat pump system forms part of an electricity distribution grid ancillary service support system.

Typically, in certain embodiments (typically in embodiments where the heat pump system is operating within an industrial setting which supplies high temperature process heat (say, for example, where the regenerative thermal machine can be used in heat pump mode to increase the temperature of a waste heat stream to manufacture steam)), the electrical machine is further configured for generating electricity and preferably is configured to deliver said generated electricity to said electricity distribution grid. Typically, the electrical machine is (also or alternatively) configured for driving the regenerative thermal machine by means of electricity drawn from said electricity distribution grid. Preferably, the electrical machine is transformable between generating electricity and delivering said generated electricity to said electricity distribution grid and driving the regenerative thermal machine by means of electricity drawn from said electricity distribution grid by operation of the phase change means and more preferably solely by operation of the phase change means. In such certain embodiments, the regenerative thermal machine is capable of operating as a bi-modal regenerative thermal machine based electricity distribution grid ancillary service support system.

In one or more embodiments, the electrical machine may be an asynchronous machine/induction machine and in said one or more embodiments, the asynchronous machine/induction machine is capable of being operated in an asynchronous motor mode wherein the asynchronous machine is powered by electricity from the electricity distribution grid in order to provide mechanical power to drive the said regenerative thermal machine in a heat pump mode and more preferably, can be operated by the phase change device to transform between heating heat pump mode and cooling heat pump mode (and as such can be used in preferred embodiments as a boiler replacement in domestic and commercial buildings).

Optionally, the phase change means is configured to change the operation of the regenerative thermal machine between one heat pump mode and another heat mode (in both of which modes the regenerative thermal machine is driven by the electrical machine) and further optionally said one heat mode is a heating heat pump mode and said other heat mode is a cooling heat pump mode. Optionally, the associated phase change means is configured to change the operation of the regenerative thermal machine between said heating and cooling heat pump modes relatively seamlessly, preferably without having to reverse the direction of rotation of the input/output drive end of the regenerative thermal machine. In preferred such embodiments, said electrical machine is typically either an asynchronous electrical machine or a synchronous electrical machine.

Alternatively, in one or more other embodiments, the electrical machine is a synchronous machine.

Typically, the synchronous machine is capable of being operated in a synchronous motor mode wherein the synchronous machine is powered by electricity from the electricity distribution grid in order to provide mechanical power to drive the said regenerative thermal machine in heat pump mode.

Preferably, in certain embodiments (typically in embodiments where the heat pump system is operating within an industrial setting which supplies high temperature process heat (say, for example, where the regenerative thermal machine can be used in heat pump mode to increase the temperature of a waste heat stream to manufacture steam)), the synchronous machine is also capable of being operated in a synchronous generator mode wherein the synchronous machine is capable of being powered by mechanical power provided by the said regenerative thermal machine operating in engine mode in order for the synchronous machine to supply electricity to the electricity distribution grid and in such an embodiment, the regenerative thermal machine is capable of operating as a bi-modal regenerative thermal machine based electricity distribution grid ancillary service support system.

Preferably, the phase change means is configured to change the operation of the regenerative thermal machine from a heat pump mode in which the regenerative thermal machine is driven by the synchronous machine (when the synchronous machine is operating in said synchronous motor mode) and an engine mode in which the regenerative thermal machine drives the synchronous machine (such that the synchronous machine is operating in said synchronous generator mode) to generate electricity, and vice versa.

Optionally, the phase change means can change the operation relatively seamlessly between heat pump mode and engine mode, preferably without having to reverse the direction of rotation of the input/output drive end of the regenerative thermal machine.

Preferably, the controller comprises an electronic control system, which may permit connection to at least the internet and preferably also a 'smart grid', which allows the system to be tuned to the point of maximum efficiency, or the point of maximum thermal output, or some other point in between that maximises overall benefit. For example, on an extremely cold day, the machine may be tuned for thermal output over efficiency. On a mild day, when heating is barely required, it may be tuned for maximum efficiency. Typically, the electronic control system is adapted to meet peak heating demand using a physically compact regenerative thermal machine, whilst meeting specified efficiency targets averaged over a particular period in time such as a whole year. Preferably, the electronic control system can change the power output by the regenerative thermal machine so much so that it can reverse the operation of the regenerative thermal machine, that that the regenerative thermal machine transforms between being a heat pump and a generator. Typically, the provision of the phase change means permits the regenerative thermal machine to transform between being a heat pump and a generator (i.e. transforms the regenerative thermal machine to transform between a heat pump mode and a generator mode) without having to stop and change direction, or even change speed, when connected to an electricity distribution grid via a synchronous machine. Optionally, the electronic control system provides a feedback electronic control system arranged to control the regenerative thermal machine and optionally enable the regenerative thermal machine to interact with the electricity distribution grid.

Preferably, the electronic control system and more preferably the feedback electronic control system enables the heat pump system to provide ancillary services to the electricity distribution grid including one or more of:
a) Firm Frequency Response (FFR);
b) Frequency Control by Demand Management (FCDM);
c) Short Term Operating Reserve (STOR);
d) Inertia;
e) Reactive power; and
f) Black Start.

Optionally, the synchronous machine is configured to interchangeably operate as a motor in which it receives electrical motive power from the electricity distribution grid in order to drive the Stirling cycle machine in the heat pump mode, and operate as a Stirling cycle machine-driven generator to produce and feed electrical power into said electricity distribution grid.

Optionally, the synchronous machine is permanently connected to the electricity grid.

Optionally, the regenerative thermal machine comprises compression and expansion spaces and a drive mechanism adapted to vary the volume of the said compression and expansion spaces with respect to one another. Typically, the said spaces comprise cylinders and said drive mechanism comprises respective reciprocating pistons located within said cylinders and moveable therein, said drive mechanism further comprising the pistons being connected by a connection rod to a crankshaft.

Optionally, the phase change means comprises any one or more of a stepper motor, brake and/or suitable electrically, mechanically, hydraulically or pneumatically actuated mechanisms.

Alternatively, and/or additionally, the phase change means may comprise (and preferably may further comprise) a phase change transmission.

The phase change transmission is typically mechanically coupled within the crankshaft of the regenerative thermal machine and is typically located internally within the regenerative thermal machine, and is preferably located between the compression and expansion spaces, and more preferably mechanically couples one portion (preferably a half) of the crankshaft to another portion (preferably the other half) of the crankshaft, wherein the phase change transmission can change the relative angle between the two portions of the crankshaft and thereby preferably can change the phase relationship between the compression and expansion spaces (typically by changing the reciprocating phase relationship between the respective reciprocating pistons via their respective reciprocating connecting rods).

Optionally, the phase change transmission is a phase change gearbox.

Optionally, the phase change gearbox is an epicyclical gearbox.

Advantageously, the direction of rotation of the crankshaft is maintained as the regenerative thermal machine changes mode from heat pump to heat engine and vice versa.

Alternatively, the regenerative thermal machine comprises a separate drive mechanism adapted to vary the volume of each respective said compression and expansion space with respect to one another. In such an alternative embodiment, each separate drive mechanism comprises its own separate respective electrical machine, wherein each of the two electrical machines are coupled via a suitable electrical or electronic circuit such that a control system can adjust and/or change the phase angle for at least one of the separate drive mechanisms.

Optionally, the releasable coupling comprises a clutch.

Optionally, the electricity distribution grid ancillary service support system further comprises an inertial mass which may be in the form of at least one flywheel device.

Optionally, at least one of the said at least one flywheel device(s) is located intermediate the releasable coupling and the synchronous machine.

Typically, the regenerative thermal machine comprises a first heat exchanger and a second heat exchanger, wherein one heat exchanger is typically a hot side heat exchanger (Hx) in use and one heat exchanger is typically a cold side heat exchanger (Cx) in use, and wherein the respective heat exchangers are typically in fluid communication with a compression and expansion space of the regenerative thermal machine, the specific compression and expansion space typically depending upon whether the regenerative thermal machine is in engine mode or heat pump mode.

Optionally, the or each heat reservoir(s) are in fluid communication with the hot side heat exchanger (Hx).

Optionally, the or each heat reservoir(s) are in fluid communication with the cold side heat exchanger (Cx).

Optionally, at least one heat reservoir is in fluid communication with the hot side heat exchanger (Hx) and at least one heat reservoir is in fluid communication with the cold side heat exchanger (Cx).

Typically, the heat reservoirs may be heat sources or heat sinks, As a heat source, a heat reservoir supplies thermal energy to the system. As a heat sink, a heat reservoir removes thermal energy from the system.

It will be understood that a heat reservoir (i.e. heat source or heat sink) in fluid communication with the cold side heat exchanger may be referred to as a cold reservoir, a cold heatsink or a cold source.

It will be further understood that a heat reservoir (i.e. heat source or heat sink) in fluid communication with the hot side heat exchanger may be referred to as a heat reservoir, a hot heatsink or a hot source.

Conveniently, suitable heat sources and heat sinks include, but are not limited to: ground loops, ground water, rivers, lakes, sea, air, water in mineshafts, buildings, district heating, greenhouses, swimming pools, sewage plants, supermarkets, fridges/freezers, solar absorbers, water tanks and Phase Change Material (PCM) batteries.

Optionally, the heat pump system further comprises an internal heat exchanger or 'regenerator' (Rx) which is preferably intermediate and in fluid communication with the hot side heat exchanger (Hx) and the cold side heat exchanger (Cx).

Alternatively, the heat pump system comprises a recuperator intermediate and in fluid communication with the hot side heat exchanger (Hx) and the cold side heat exchanger (Cx).

Optionally, the regenerator (Rx) comprises a wire mesh or woven wire cloth.

Alternatively, the regenerator (Rx) comprise any one of sintered metal powder, fibre (metallic or non-metallic), compact design or rotary regenerators.

Optionally, the heat pump system comprises a hot store intermediate the hot side heat exchanger (Hx) and a heat reservoir.

Conveniently, the hot store is functionally a heat battery.

Optionally, the hot store comprises a hot water tank or tanks.

Optionally, the hot store comprises one or more Phase Change Material (PCM) batteries.

Optionally, when the heat pump system is in heat pump mode, heat extracted from the cold reservoir is stored in the hot store.

Optionally, when the heat pump system is in engine mode, heat extracted from the hot store is dissipated in a cold reservoir.

Optionally, a plurality of heat sources and/or heat sinks can be connected to the hot store.

Optionally, by means of one or more valve(s) or other suitable diversion means, the hot side heat exchanger Hx is fluidly dis-connectable from the hot store such that when the hot store is full, the hot side heat exchanger is connectable to an alternative hot store and/or an additional/other heat source or sink. In this arrangement, different hot stores can be charged at different temperatures.

Optionally, the heat pump system comprises one or more cold store(s).

Optionally, the one or more cold store(s) are located intermediate the cold side heat exchanger Cx and a respective cold reservoir.

Optionally, the one or more cold store(s) comprises one or more Phase Change Material (PCM) batteries.

Optionally, when the heat pump system is in heat pump mode, heat extracted from the cold store is stored in the hot store.

Optionally, when the heat pump is in engine mode, heat extracted from the hot store is dissipated in the cold store.

Optionally, multiple heat sources and heat sinks can be connected to and disconnected from the hot and cold stores. For example, equipment such as but not limited to refrigerators or air conditioning units could be connected to a cold store.

Optionally, by means of one or more valve(s) or other suitable diversion means, in the event the cold store is full (e.g. the PCM material is solid) but the hot store has capacity, further heat sources are connectable to the cold side heat exchanger Cx and/or heat can be leaked into the cold store to melt a portion of the PCM.

In accordance with a further aspect of the invention there is provided a method of providing ancillary services to an electricity distribution grid, the method comprising the steps of providing one or heat pump systems in accordance with the first aspect of the invention, and operatively connecting said one or more heat pump system(s) to the grid.

In accordance with a further aspect of the invention there is provided a method of operating a heat pump system, comprising:

providing a heat pump system comprising a regenerative thermal machine in fluid communication with one or more heat reservoirs, wherein the regenerative thermal machine comprises working fluid compression and expansion spaces and further comprises a phase change means operable to change the phase relationship between the said working fluid compression and expansion spaces of the regenerative thermal machine; and further providing an electrical machine and electrically connecting said electrical machine to an electricity distribution grid; and operating the phase change means to change the phase relationship between the said working fluid compression and expansion spaces of the regenerative thermal machine.

Preferably, the method of either aspect of the present invention further comprises providing a plurality of said heat pump systems and more preferably comprises distributing said plurality of heat pump systems around the electricity distribution grid in an aggregated distribution.

Optionally, the method further comprises the step of remotely activating the one or more heat pump systems to provide one or more ancillary service support system(s).

Optionally, the heat pump systems and/or ancillary service support systems operate as part of a smart grid (which may be connected via the internet), where one or more and more preferably a plurality of the heat pump systems and/or ancillary service support systems are electronically controlled from one or more centralised location(s) which can control each individual heat pump systems and/or ancillary service support system in isolation and/or can control a plurality of said heat pump systems and/or ancillary service support systems simultaneously.

In accordance with a further aspect of the invention there is provided an electricity distribution grid comprising a heat pump system and/or an ancillary service support system in accordance with the first aspect of the invention.

Preferably, the method further comprises, in the event of a black out of at least a part of the electricity distribution grid, actuating one or more preferably a plurality of the heat pump systems and/or ancillary service support systems to change the operation of each regenerative thermal machine or each said respective heat pump systems and/or ancillary service support system into its respective engine mode and engaging the respective clutch (if it is not already engaged) of each heat pump systems and/or ancillary service support system to drive the respective synchronous machine (in its synchronous generator mode) of each heat pump systems and/or ancillary service support system to provide a black start to the grid. Optionally, in such a circumstance, the source of energy to drive each said regenerative thermal machine is preferably heat stored within the respective one or more heat reservoirs. Alternatively, direct firing of each said regenerative thermal machine with fuel such as hydro- carbon based fuel such as gas, oil or other suitable fuel could also be used as a back-up energy source.

Preferably, the regenerative thermal machine is a Stirling cycle machine and may be a Stirling cycle machine as disclosed in WO2014/135895A1.

Various examples and aspects of the invention will now be described in detail with reference to the accompanying figures. Still other aspects, features, and advantages of the present invention are readily apparent from the entire description thereof, including the figures, which illustrate a number of exemplary aspects and implementations. The invention is also capable of other and different aspects and implementations, and its several details can be modified in various respects, all without departing from the present invention. Accordingly, the drawings and descriptions are to be regarded as illustrative in nature, and not as restrictive. Furthermore, the terminology and phraseology used herein is solely used for descriptive purposes and should not be construed as limiting in scope. Likewise, the term "comprising" is considered synonymous with the terms "including" or "containing" for applicable legal purposes.

Any discussion of documents, acts, materials, devices, articles and the like is included in the specification solely for the purpose of providing a context for the present invention. It is not suggested or represented that any or all of these matters formed part of the prior art base or were common general knowledge in the field relevant to the present invention.

It should be understood that the terms 'hot' and 'cold' in the context of the invention are not absolute, but rather are relative terms.

All singular forms of members, or any other components described herein are understood to include plural forms thereof and vice versa.

Features or integers of any aspect or example of the invention can be incorporated into any other aspect or example of the invention as appropriate and vice versa.

BRIEF DESCRIPTION OF THE DRAWINGS NOT IN ACCORDANCE WITH THE PRESENT INVENTION

FIG. 1(a) is a schematic diagram of a uni-modal Stirling heat pump based system which is not in accordance with the invention; and FIG. 1(b) is a schematic diagram of a uni-modal Stirling heat pump based system with cold energy storage which is also not in accordance with the invention

BRIEF DESCRIPTION OF THE DRAWINGS IN ACCORDANCE WITH THE PRESENT INVENTION

FIG. 2(a) is a schematic diagram of an exemplary bi-modal Stirling cycle machine (i.e. a Stirling engine/Stirling heat pump) based electricity distribution grid ancillary service support system based around a regenerative thermal machine in the form of a Stirling cycle machine in accordance with the invention, and which utilizes a clutch 140, an optional gearbox 135 and either a synchronous or asynchronous electrical motor 130;

FIG. 2(b) is a schematic diagram of an exemplary bi-modal Stirling engine/heat pump based electricity distribution grid ancillary service support system based around a regenerative thermal machine in the form of a Stirling cycle machine in accordance with the invention, and which utilizes an optional gearbox 135, an asynchronous electrical motor 133 and a variable frequency drive 132;

FIG. 3(a) is a schematic diagram of an exemplary bi-modal Stirling engine/heat pump based electricity distribution grid ancillary service support system with hot energy storage based around a regenerative thermal machine in the form of a Stirling cycle machine, in accordance with the invention, and which utilizes a clutch 140, an optional gearbox 135 and either a synchronous or asynchronous electrical motor 130;

FIG. 3(b) is a schematic diagram of an exemplary bi-modal Stirling engine/heat pump based electricity distribution grid ancillary service support system with hot energy storage based around a regenerative thermal machine in the form of a Stirling cycle machine in accordance with the invention, and which utilizes an optional gearbox 135, an asynchronous electrical motor 133 and a variable frequency drive 132;

FIG. 4(a) is a schematic diagram of an exemplary bi-modal Stirling engine/heat pump based electricity distribution grid ancillary service support system with hot and cold energy storage based around a regenerative thermal machine in the form of a Stirling cycle machine in accordance with the invention and which utilizes a clutch 140, an optional gearbox 135 and either a synchronous or asynchronous electrical motor 130;

FIG. 4(b) is a schematic diagram of an exemplary bi-modal Stirling engine/heat pump based electricity distribution grid ancillary service support system with hot and cold energy storage based around a regenerative thermal machine in the form of a Stirling cycle machine in accordance with the invention, and which utilizes an optional gearbox 135, an asynchronous electrical motor 133 and a variable frequency drive 132;

FIG. 5(b) is a schematic diagram showing some of the components/sensors associated with the Stirling cycle machine system (particularly when in heat pump mode) of FIGS. 2(a) and (b), 3(a) and (b) and 4(a) and (b) and which are used in conjunction with the heating system used in the building 255 of FIG. 5(a);

Figure 2A:
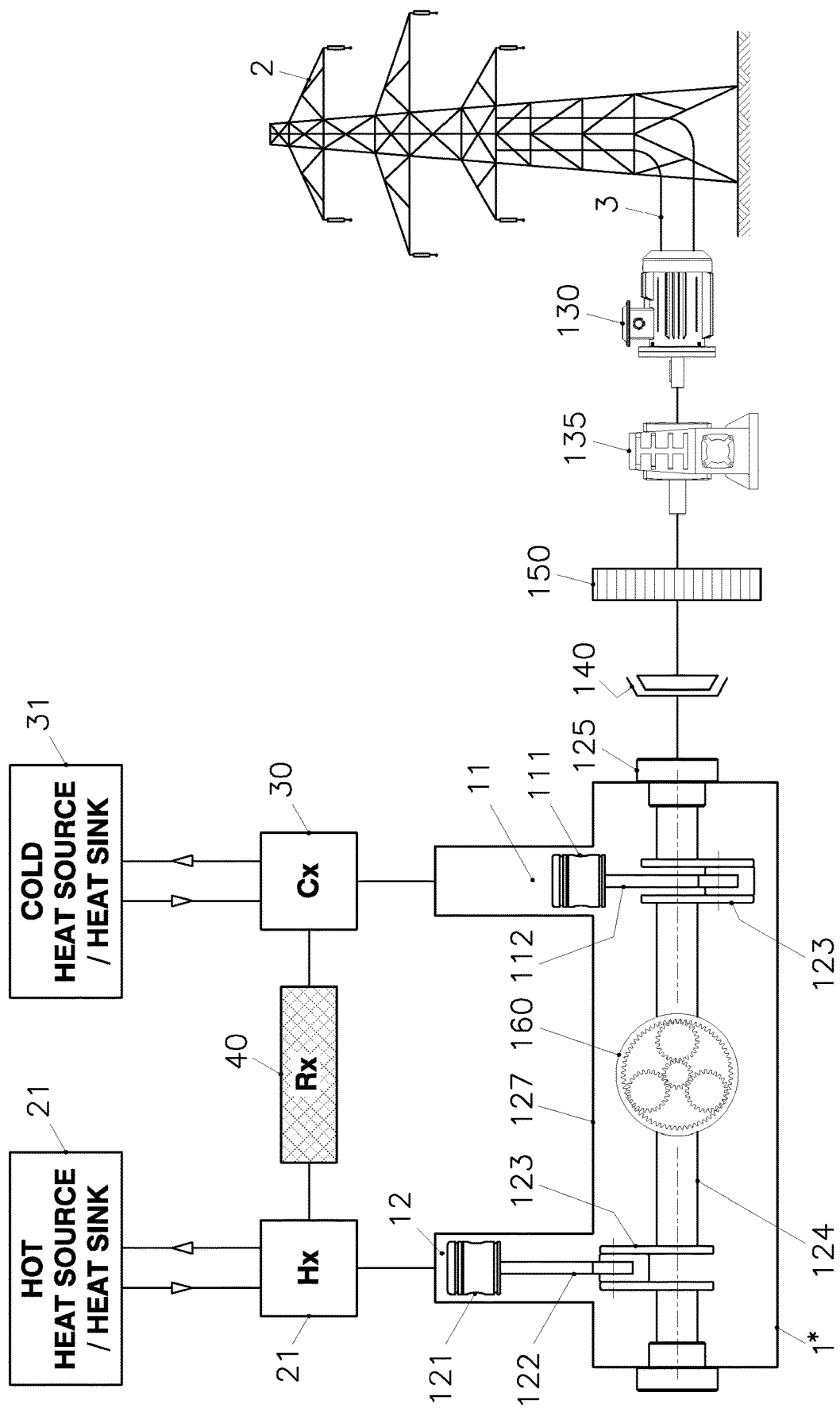
Figure 5A:
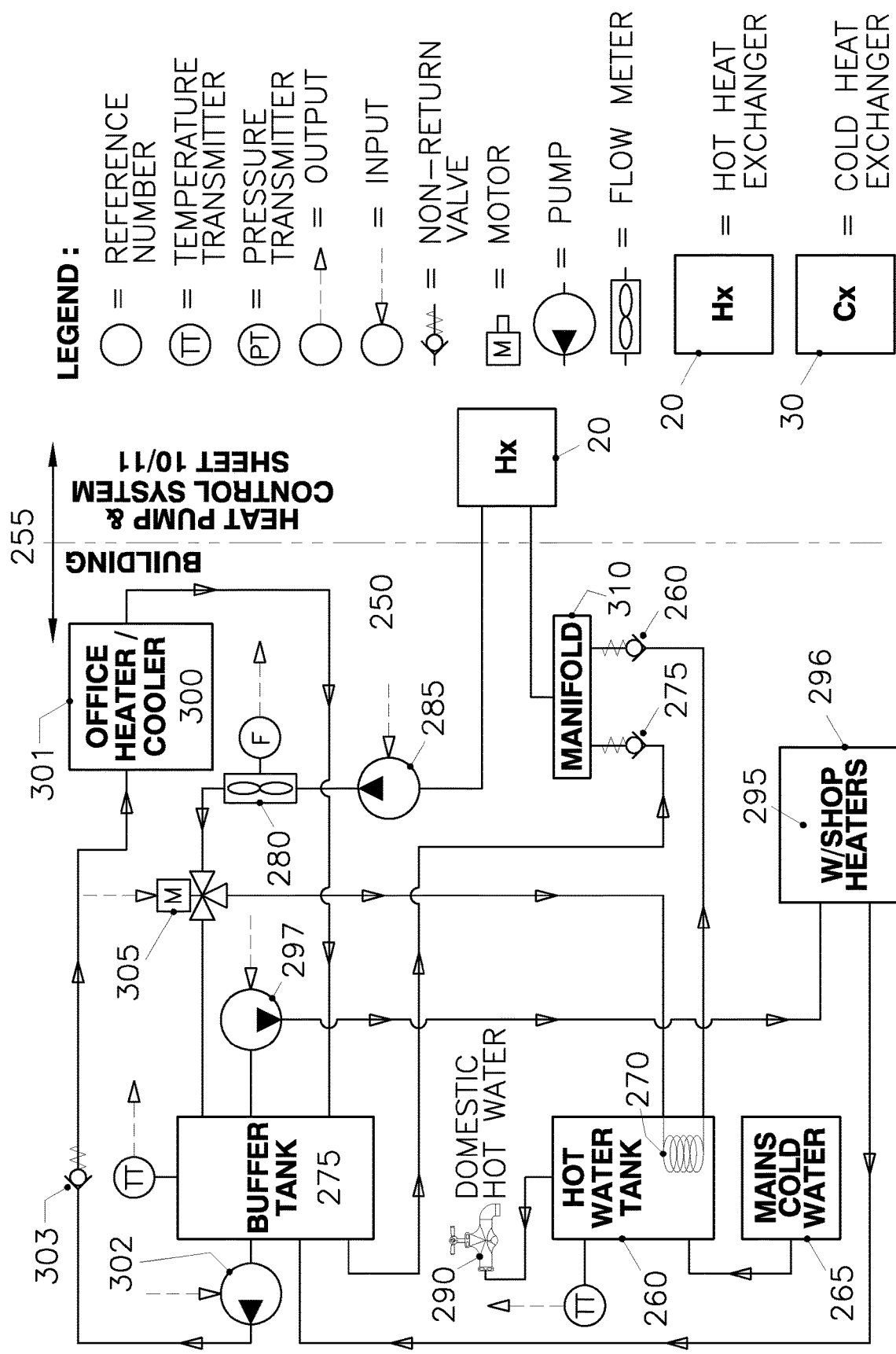
FIG. 5(a) is a schematic diagram of components/sensors provided for a heating system used in a building 255 and which are connected to the hot heat exchanger (Hx) 20 of the Stirling cycle machine system of FIGS. 2(a) and (b), 3(a) and (b) and 4(a) and (b)
Figure 6:
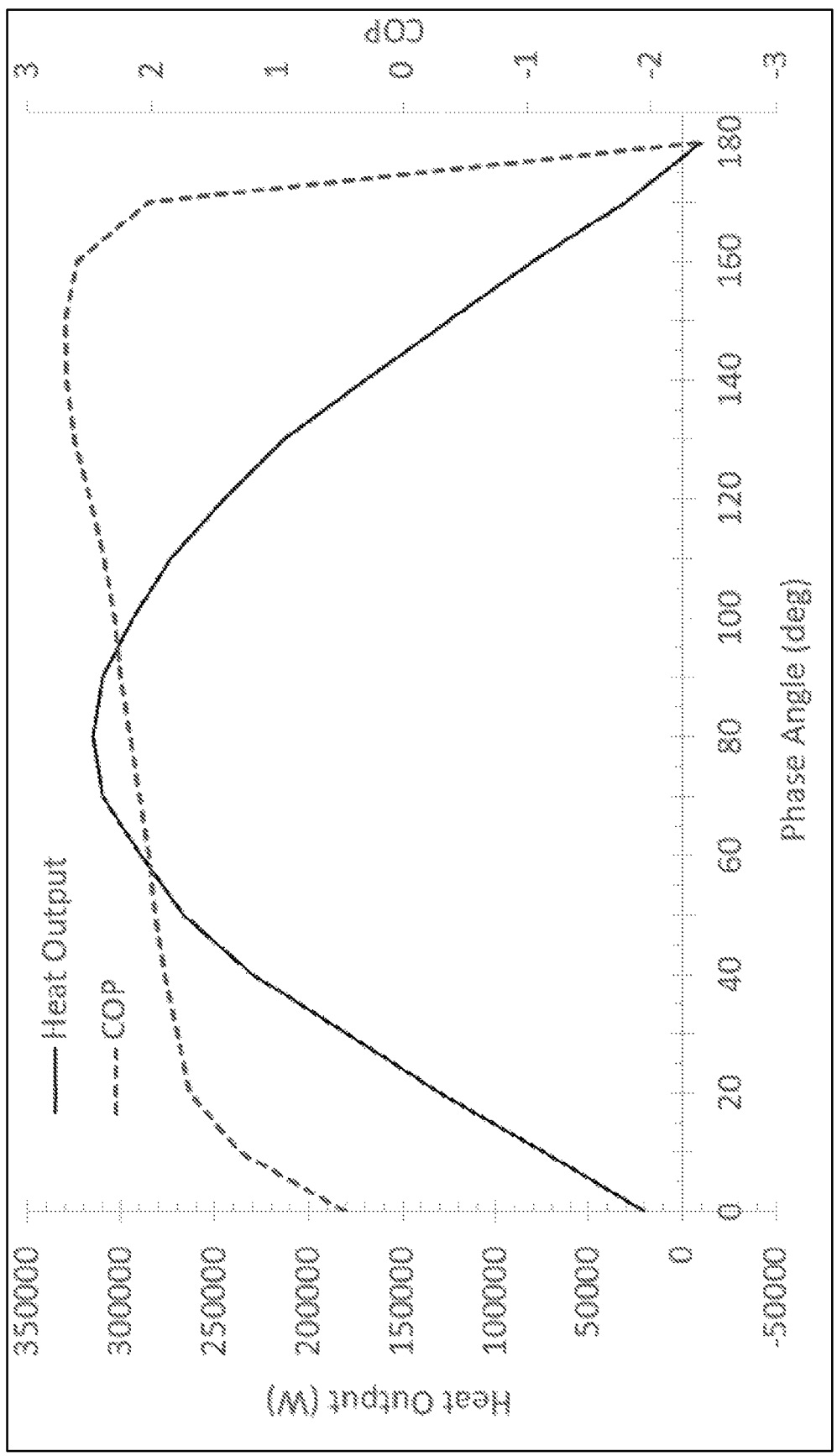

FIG. 5(c) shows the control system (including thermostats 335; 340 and PLC 350) for controlling both the Stirling cycle machine system (particularly when in heat pump mode) of FIGS. 2(a) and (b), 3(a) and (b) and 4(a) and (b) (and its associated components/sensors shown in FIG. 5(b) and heating system used in the building 255 of FIG. 5(a); and FIG. 6 is a graph showing a typical relationship between phase angle and power output (on the left hand scale)/coefficient of performance (COP) (on the right hand scale) of a Stirling cycle machine having a phase change means in the form of a phase change device such as that shown in FIGS. 2(a) and (b), 3(a) and (b) and 4(a) and (b) in accordance with the present invention.

DETAILED BUT GENERAL DESCRIPTION OF ALL THE FIGURES

Figure 1A:
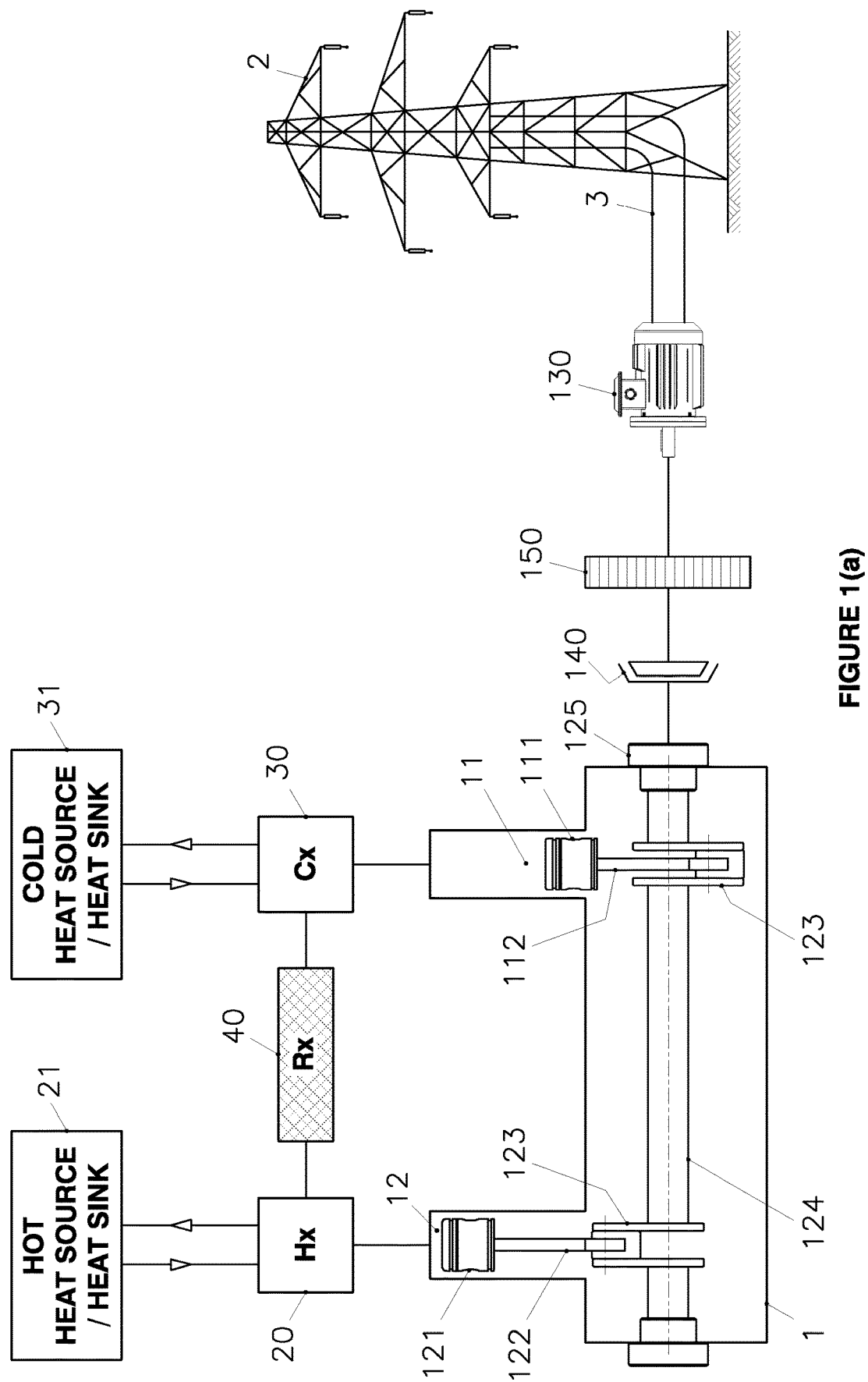
Figure 3A:
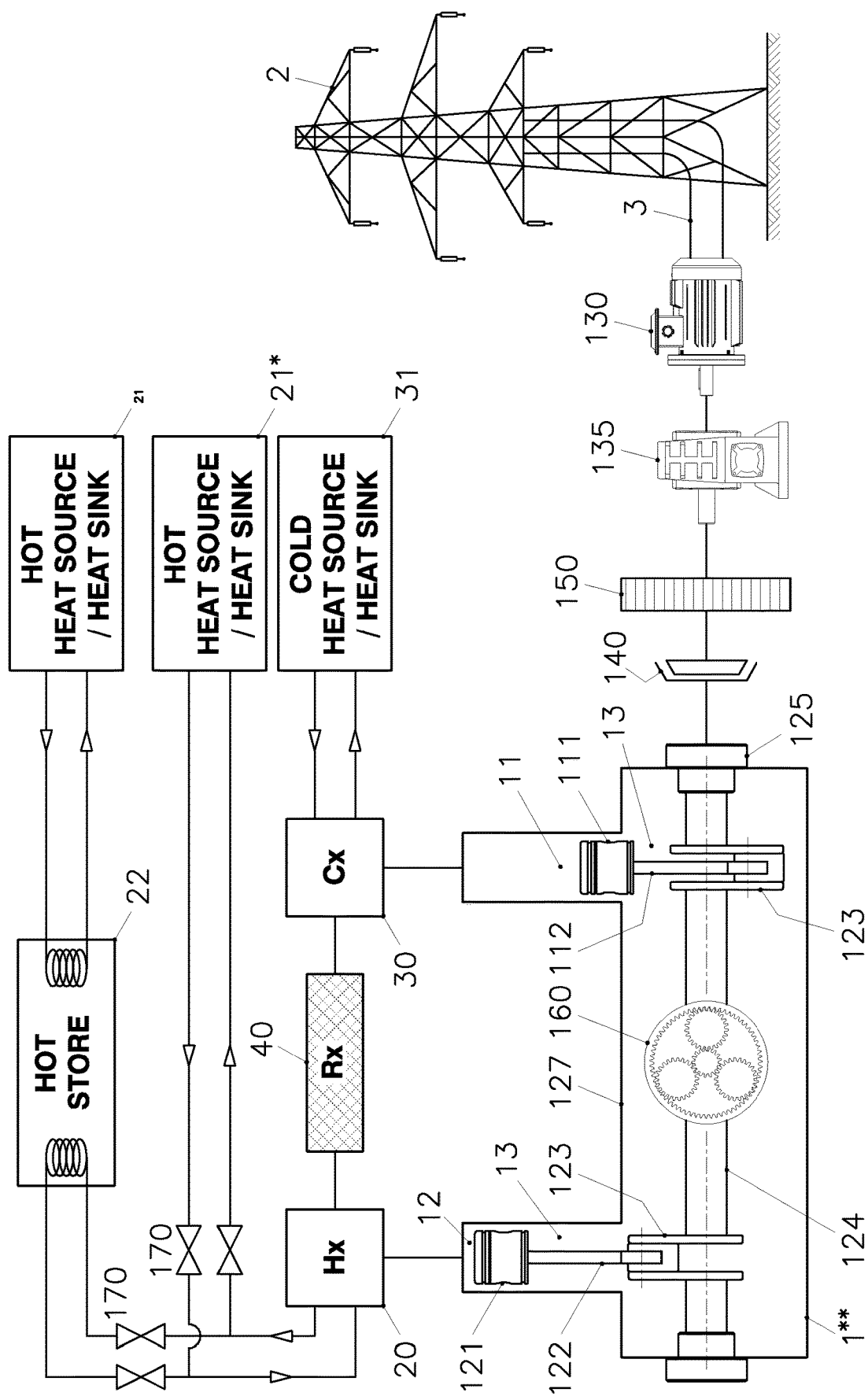
Figure 4A:
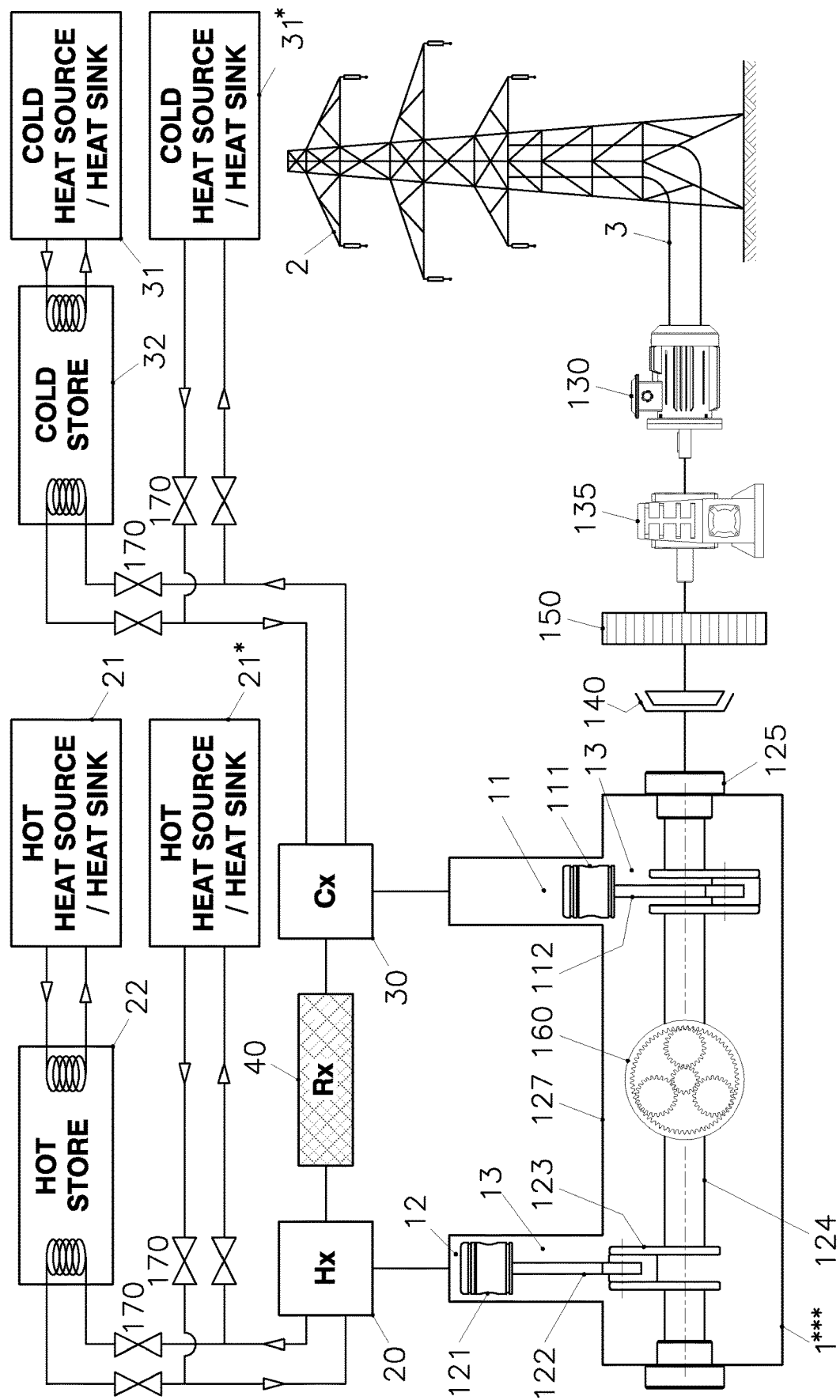

In the figures, there is shown a number of regenerative thermal machines in the form of exemplary Stirling cycle machines and which are incorporated in electricity distribution grid ancillary service support systems in accordance with the invention that are connectable to an electricity grid 2, for example a National Grid, via a suitable interconnector 3. The different Stirling cycle machines are referenced in the figures as follows:

Referenced as—
1 in FIGS. 1(a) and (b) (which are not in accordance with the present invention);
1* in FIGS. 2(a) and (b) (which are in accordance with the present invention);
1** in FIGS. 3(a) and (b) (which are in accordance with the present invention); and
1*1* in FIGS. 4(a) and (b) (which are in accordance with the present invention);

The skilled reader will understand that the term uni-modal as used herein means a conventional heat pump, either heating and/or cooling, but capable of pumping heat in one direction only, albeit with the additional ability to participate in demand-side response (i.e. to provide inertia when required) and operate as a synchronous compensator when de-clutched.

The skilled reader will further understand that the term bi-modal as used herein means capable of changing seamlessly from heat pump mode to heat engine mode, (and advantageously for embodiments of the present invention as described herein, changing seamlessly from heat pump mode to heat engine mode without stopping and reversing rotational direction of the crankshaft) and preferably whilst continuing to rotate in the same direction. It also means the ability to modulate, or throttle, output in both heat pump and heat engine modes.

In the figures, the Stirling cycle machines 1, 1*, 1 and 1*1*** of the systems shown therein are adapted to function as a heat pump. In general, use of a Stirling cycle machine as a heat pump provides several advantages over a refrigerant heat pump. A Stirling cycle machine can overcome greater temperature differences because it is not restricted by the physical properties of a refrigerant, which undergoes a phase change during the process. Because of the lack of a refrigerant, which only works in a specific temperature range around its boiling point, use of a Stirling cycle machine means that the working temperature range of working fluid (which is typically gas such as air or other suitable gaseous fluid contained within the Stirling cycle machine 1, 1*, 1 and 1*) can be changed during operation. Any suitable Stirling cycle machine could be used as the Stirling cycle machine 1, 1*, 1 and 1* but a much preferred Stirling cycle machine is that offered by Whittaker Engineering (Stonehaven) Limited of Stonehaven, Scotland and/or as described in WO2014/135895A1, the whole contents of which are incorporated herein by reference. However, the skilled person will understand that less preferred embodiments of the preferred embodiments shown in FIGS. 2(a) and (b), 3(a) and (b) and 4(a) and (b) could include other types of regenerative thermal machines such as any one or more than one of the following:

a) other types of Stirling cycle machines;
b) other (i.e. non-Stirling cycle machine) piston(s) and cylinder(s) combinations including single acting e.g. Laubereau Schwartzkopff, Heinrici, Rainbow, Robinson, Rider parallel, Rankin Napier, parallel, V cylinder and opposed cylinder types;
c) other (i.e. non-Stirling cycle machine) Piston(s) and cylinder(s) combinations including double acting e.g. Finkelstein and Rinia types;
d) Rotary versions e.g. Rotary Finkelstein and Zwiauer Wankel;
e) Bellows and diaphragm types;

f) Free piston types;

g) Ericsson Engine types.

The skilled person will also understand that the ancillary service support systems described hereinafter in relation to the embodiments shown in FIGS. 2(a) and (b), 3(a) and (b) and 4(a) and (b) are capable of providing support to the electricity distribution grid 2 system for one, more than one or all of the following service requirements:

- a) Firm Frequency Response (FFR)—this is the provision of generation in response to changes in the system frequency;
- b) Frequency Control by Demand Management (FCDM)—this is the provision of frequency support by load shedding;
- c) Short Term Operating Reserve (STOR)—this is the supply of a specified level of supply (of electricity) or a specified reduction in demand (i.e. load) at agreed time(s) (these times being known as "availability windows");
- d) Inertia—this is the supply of kinetic energy stored in the rotating parts attached to the grid 2 and can provide time for other services (scu as FFR) to act before e.g. low frequency limits are breached;
- e) Reactive power—this is energy which flows back and forth in the grid 2 without doing useful work and such flows are typically associated with devices that store energy in either electric or magnetic fields, and the flow of reactive power affects grid system voltage which must be managed at a local level by injection of reactive power; and
- f) Black Start—this refers to system start up following a complete or partial shutdown.

It is therefore a desire and/or an object for embodiments described herein in relation to FIGS. 2(a) and (b), 3(a) and (b) and 4(a) and (b) to provide one, more than one or all of services a) to f) as part of ancillary services to support an electricity grid system 2.

In each of the systems shown in the FIGS. 1 to 4(b), the Stirling cycle machine 1, 1\*, **1\*\*, and 1\*\*\* of the heat pump system comprises compression and expansion spaces 11, 12 within which respective reciprocating pistons 111 and 121 move. The connection rod 112, 122 of each piston 111, 121 is connected by a respective crank pin 123 to a crankshaft 124**.

The heat pump system includes a hot side heat exchanger (Hx) 20 and a cold side heat exchanger (Cx) 30, the heat exchangers in fluid communication with a respective compression and expansion space 11, 12 of the Stirling cycle machine 1, 1\*, **1\*\*, and 1\*\*\*, One or more heat reservoir(s) 21 are in communication with the hot side heat exchanger (Hx) 20. One or more heat reservoir(s) 31 are in communication with the cold side heat exchanger (Cx) 30**.

In operation, the Stirling cycle machine 1, 1\*, **1\*\* and 1\*\*\* moves heat from one heat exchanger 20, 30 to the other 20, 30, The heat exchangers 20, 30** are at different temperature levels. The higher temperature heat exchanger is referred to as hot, and the lower temperature heat exchanger is referred to as cold. It should be understood that the terms 'hot' and 'cold' are not absolute, but rather are relative terms. For example, a heat exchanger at 0° C. can be considered hot as long as it is at a temperature higher than the cold side heat exchanger temperature.

In all of the FIGS. 1 to 4(b), the hot side heat exchanger (Hx) 20 is shown as the heat exchanger that has the working fluid being in fluid communication (i.e. connected to) with the heat reservoir(s) 21 having the higher temperature, with the cold side heat exchanger (Cx) 30 that has the working fluid being in fluid communication (i.e. connected to) with the heat reservoir(s) with the lower temperature.

Each heat exchanger 20, 30 can either absorb or expel heat, depending upon the operating mode of the Stirling cycle machine, but they have opposite functions in use, i.e. if one heat exchanger absorbs heat, the other heat exchanger expels heat.

Heat exchangers 20, 30 may be provided as shell and tube or compact design, heat exchangers.

Heat reservoirs 21, 31 may be either heat sources or heat sinks.

Intermediate, and in fluid communication with, the hot side heat exchanger (Hx) 20 and the cold side heat exchanger (Cx) 30 there is provided an internal heat exchanger or 'regenerator' (Rx) 40.

Regenerator (Rx) 40 may comprise a wire mesh or woven wire cloth.

Alternatively, the regenerator (Rx) 40 may comprise sintered metal powder, fibre (metallic or non-metallic), compact design, or rotary regenerators.

Further optionally, in place of a regenerator (Rx) 40 there may be provided a recuperator (not shown) to perform the task of internal heat exchange. In such an arrangement two Stirling cycle machines (not shown) would be required to run "back-to-back".

As a heat source, a heat reservoir 21 supplies thermal energy to the respective system. As a heat sink, a heat reservoir 21 removes thermal energy from the respective system.

For example, a ground loop can either supply heat to heat a building or it can absorb heat to cool a building. Whether a heat reservoir absorbs or expels heat depends on the design and/or operating mode of the Stirling cycle machine.

Examples of suitable heat sources and heat sinks include, but are not limited to: ground loops, ground water, rivers, lakes, sea, air, water in mineshafts, buildings, district heating, greenhouses, swimming pools, sewage plants, supermarkets, fridges/freezers, solar absorbers, water tanks and Phase Change Material (PCM) batteries (the simplest being water/ice).

The direction in which heat flows between the heat exchangers 20, 30 is determined by the phase angle between the volume variations of the compression and expansion spaces 11, 12.

Figure 1B:
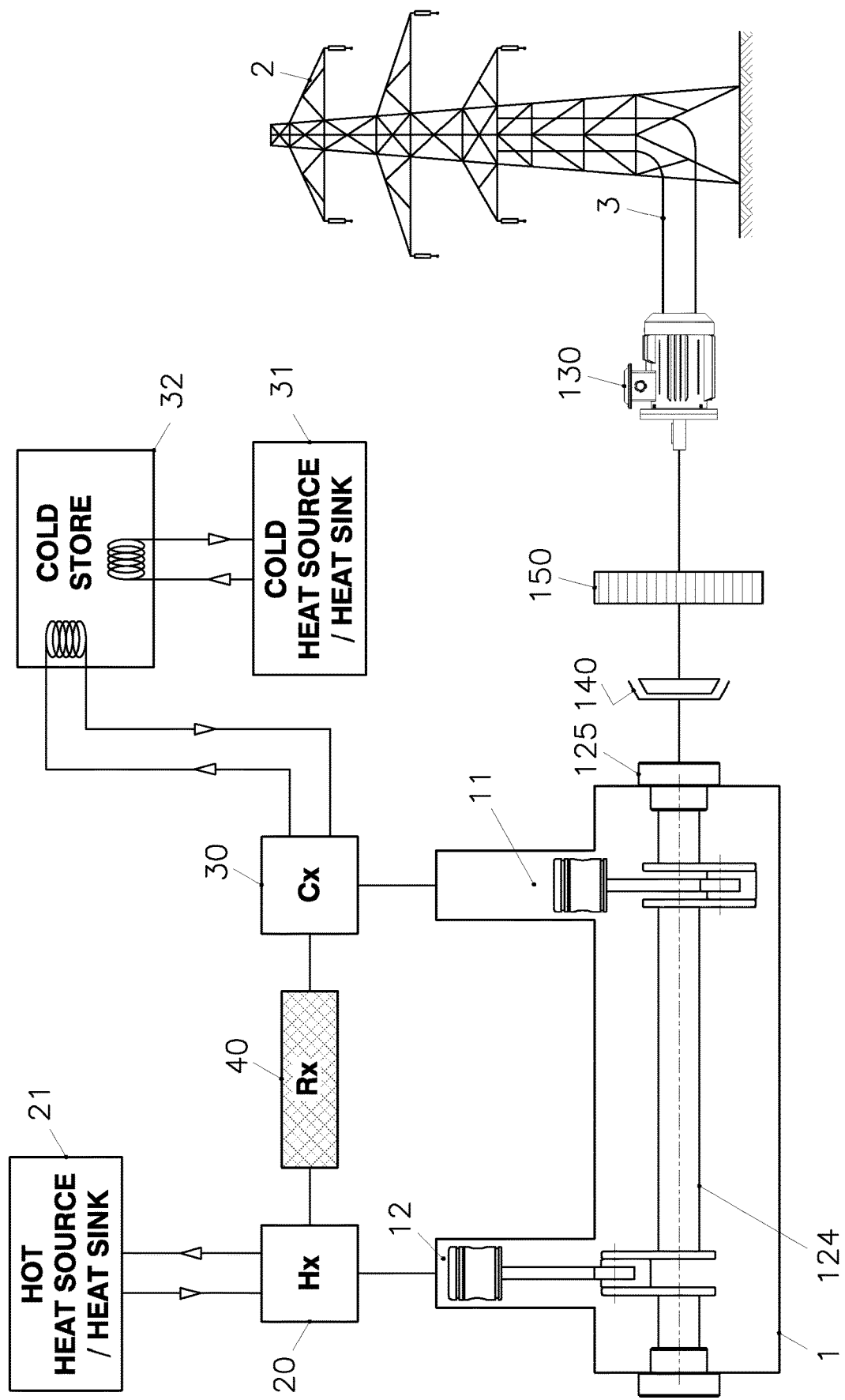

In relation to the systems of FIGS. 1(a) and 1(b) which are not in accordance with the present invention, the phase angle solely depends upon the placement of the crank pins 123 on the crankshaft 124 and therefore cannot be changed without bringing the Stirling cycle machine 1 to a complete halt (i.e. taking it offline or out of operation) and then manually adjusting the placement of the crank pins 123 on the crankshaft and then restarting the Stirling cycle machine 1.

In relation to the embodiments of the systems in accordance with the present invention of FIGS. 2(a) and (b), 3(a) and (b) and 4(a) and (b), in addition to the manual adjustment of the phase angle by virtue of changing the placement of the crank pins 123 on the crankshaft 124 (which entails the disadvantage of having to bring the Stirling cycle machine 1 to a complete halt and then manually adjusting the placement of the crank pins 123 on the crankshaft and then restarting the Stirling cycle machine 1), the phase angle can be changed by operation of a phase change means 160 in the form of a phase change mechanism 160 or phase change device 160 which therefore provides great advantages in terms of significantly increased control (by means of a controller in the form of a control system as will be subsequently described) and resulting efficiency of the operation of the Stirling cycle machines 1*, 1 and 1* but which also enables significant additional operations and applications of use of the embodiments of the systems in accordance with the present invention of FIGS. 2(a) and (b), 3(a) and (b) and 4(a) and (b) as will be described subsequently.

Detailed Description of the System of FIGS. 1(a) and 1(b) not in Accordance With the Present Invention FIG. 1(a)—Stirling Cycle Machine 1

In the system shown in FIG. 1(a) (which is not in accordance with the present invention), the phase angle is fixed by the geometry of the crankshaft 124. In this arrangement there is only one operating mode, as described below. The system of FIG. 1(a) can therefore be considered as unidirectional. A different fixed phase angle can be implemented by altering the crankshaft 124 geometry, specifically by altering the relative positions of the respective crank pins 123. A 180° Change of phase angle can also be achieved by turning the engine in the opposite direction.

As shown in FIG. 1(a), an input/output end of the Stirling cycle machine 1, for example a drive end 125 of the crankshaft 124, is in communication with (and in particular is mechanically connected to) the rotor of an electrical machine which is typically a synchronous machine 130 but could be an asynchronous machine (not shown in FIG. 1(a) but which would be located at the same location instead of (and therefore replace) the synchronous machine 130 in FIG. 1(a). In addition, a Variable Frequency Drive (VFD) (not shown in FIG. 1(a)) could also be included in the alternative scenario of the electrical machine being an asynchronous machine, where the VFD is located and electrically connected in between the electricity grid 2 and the asynchronous machine. A releasable coupling in the form of a disengagement means 140 is provided intermediate the Stirling cycle machine 1 and the synchronous machine 130 and enables said Stirling cycle machine 1 and synchronous machine 130 to mechanically (i.e. rotationally) connect and disconnect from one another. The disengagement means is typically in the form of a clutch 140. However, in the alternative scenario where the electrical machine is an asynchronous machine, and where a VFD was provided, the clutch 140 wouldn't be required.

In the system shown in FIG. 1(a), the synchronous machine 130 can "only" operate uni-modal i.e. in a synchronous motor mode in that it can "only" receive electrical motive power from the electricity grid 2 in order to drive the Stirling cycle machine 1 as a heat pump (for example during periods of surplus grid electricity availability). Also, as noted above in the system of FIG. 1(a), the electrical machine 130 in the form of the synchronous machine 130 could be replaced with an asynchronous/induction machine (not shown) (in which case a VFD could also be included as well as discussed above) but a synchronous machine 130 is more typically used.

The system of FIG. 1(a) which includes Stirling cycle machine 1 is absent a phase change device and as such is therefore not in accordance with the present invention.

In relation to the system shown in FIG. 1(a), when disconnected from the Stirling cycle machine 1, the synchronous motor 130 can act as a synchronous compensator 130 in an alternating current electricity distribution grid system 2. The synchronous motor 130 is always connected to the electrical grid 2. As a result, the synchronous motor 130 turns at a fixed frequency, depending on grid frequency and number of poles of the synchronous motor 130. In normal operation the synchronous motor 130 turns continually thus supplying rotational inertia to the grid 2.

An inertial mass 150 in the form of at least one flywheel 150 is optionally provided between the Stirling cycle machine 1 and the synchronous motor 130 and has the advantage of increasing the rotational inertia supplied to the grid 2 by the synchronous motor 130.

When Stirling cycle machine 1 is not turning it is disconnected from synchronous motor 130, for example by operation of the clutch 140 to disengage the two or more clutch plates (not shown) provided therein from one another, because the synchronous motor 130 is locked to the grid frequency and always turning as described above. Stirling cycle machine 1 may be restarted by gradual re-engagement of the clutch 140 but alternatively Stirling cycle machine 1 may be (re)started by other means (not shown) and once up to desired speed can be reconnected to the synchronous motor via clutch 140. Clutch 140 is also operable to disconnect the Stirling cycle machine 1 in order to reduce load off the grid if required (i.e. demand side response).

As noted above, for heat to flow from the cold side Cx to the hot side Hx, mechanical power must be provided.

With reference to FIG. 1(a), mechanical power is provided to the Stirling cycle machine 1 by the synchronous motor 130 which drives crankshaft 124. Thus by driving the crankshaft 124 with the synchronous motor 130, in this configuration the Stirling cycle machine 1 works as a heat pump, extracting heat from the Cx reservoir 30 and expelling heat into the Hx reservoir 20. This function can be used to heat the Hx reservoir 20, cool the Cx 30 reservoir or both simultaneously. In this configuration, the system may be referred to as in "heat pump mode" or "pumping upstream".

The system of FIG. 1(a) has a fixed phase angle and the only way to change operation mode is by connecting different heat sources and sinks to the external heat exchangers.

In the system of FIG. 1(a), where the heat source is an air source heat pump, the Stirling cycle machine 1 can be used as a high delta T heat pump and this thus makes air-source heat pumps much more viable as the heat source. This is an advantage because ground loops are very disruptive and expensive, particularly compared to air source heat pumps, although because the system of FIG. 1(a) does not have the ability to change the phase angle/phase shift between the volumetric variations of the compression and expansion spaces 12, 11 in the Stirling cycle machine 1 whilst it is rotating, this advantage is significantly reduced compared with embodiments of the present invention of FIGS. 2(a) and (b), 3(a) and (b) and 4(a) and (b).

Again, because the system of FIG. 1(a) does not have the ability to change the phase angle/phase shift between the volumetric variations of the compression and expansion spaces 12, 11 in the Stirling cycle machine 1 whilst it is rotating, further advantageous applications and implementations may, for example, but not limited to, be (albeit these advantages are significantly reduced compared with embodiments of the present invention of FIGS. 2(a) and (b), 3(a) and (b) and 4(a) and (b)):

1) Air conditioning, by absorbing heat at Hx 20 from offices or living space and expelling at Cx 30 to ground loop(s) or to the ambient surroundings (air).
2) Heating, by absorbing heat from ground loop (and/or air source where an air source heat pump is being used) at Cx 30 and expelling to radiators at Hx 20.
3) Hot water, by absorbing heat from ground loop (and/or air source where an air source heat pump is being used) at Cx 30 and expelling to water tank at Hx 20.

4) Freezing food, by absorbing heat from freezer at Cx 30 and expelling at Hx 20.
5) Drying grain, hay or straw, by absorbing heat from condenser at Cx 30 and expelling to air pre-heater at Hx 20.
6) Heating and cooling, by absorbing heat from supermarket freezer at Cx 30 and expelling to selling room or offices at Hx 20.
7) Steam production, by absorbing heat from industrial waste heat at Cx 30 and expelling to steam producer at Hx 20.
8) Generating electric power for mains grid, by absorbing heat from industrial waste heat or thermal store at Hx 20 and expelling to water cooling jacket at Cx 30 (Dynamic frequency response, Operating reserve).
9) Heating greenhouses, by absorbing heat from ground loop at Cx 30 and expelling to greenhouse at Hx 20.
10) Air conditioning for sports centre and heating for swimming pools, by absorbing heat from public spaces and offices at Cx 30 and expelling to pools at Hx 20.
11) Synchronous compensator, by declutching (i.e. actuating the clutch 140 to disengage or otherwise separate the two or more clutch plates therein) the Stirling cycle machine 1 (Power factor and voltage regulation).
12) Heating and cooling, by changing heat source and heat sink at the external heat exchangers. If a house is heated as described at example 2) ("Heating") or 3) ("Hot Water") above, it can also be cooled by connecting the ground loop and/or air source as appropriate to Hx 20 and a condenser to Cx 30. Heat will then be absorbed from the house (condenser) at Cx 30 and expelled to the ground loop and/or air source as appropriate at Hx 20.

Although the system of FIG. 1(*a*) has a fixed phase angle, it can still be flexible to a certain extent, by changing heat sources and sinks at the external heat exchangers for example, by changing from ground source to air source as the ambient temperature increases.

The system of FIG. 1(*a*) is suited to use over periods of long duration whereby frequent discharging and charging of the regenerator 40 is obviated. An example of long duration use is operating the Stirling cycle machine 1 as part of an industrial process such as steam production and operating it as a synchronous compensator at night.

FIG. 1(*b*) System-Stirling Cycle Machine 1

With reference to FIG. 1(*b*), there is shown a unidirectional system and (which is also not in accordance with the present invention) incorporating Stirling cycle machine 1 that is substantially similar to that system of FIG. 1(*a*) but which includes a cold store 32. In FIG. 1(*b*), cold store 32 is shown connected between the cold side heat exchanger Cx 30 and the cold reservoir 31. The system of FIG. 1(*b*) includes Stirling cycle machine 1 (which is similar or identical to Stirling cycle machine 1 of FIG. 1(*a*)) and which is also therefore absent a phase change device and which is therefore also not in accordance with the present invention. The system of FIG. 1(*b*) is also absent a hot store. The system of FIG. 1(*b*) is typically used in applications where freezing or cooling is required and where heat is dumped.

Functionally, the system of FIG. 1(*b*) pumps heat from the cold store 32 and dumps it through hot side heat exchanger Hx 20. Cold store 32 supplies cold for freezing or cooling applications. If the cold store is fully charged, clutch 140 disconnects the Stirling engine and heat pump system 1 and the synchronous machine 130 operates as synchronous compensator.

Where the system of FIG. 1(*b*) uses the same components as those already described in relation to FIG. 1(*a*), the same reference numerals are re-used and where those components are operated in the same manner, they will not be described again for the sake of brevity and therefore the reader is referred to the description hereinbefore provided in relation to FIG. 1(*a*) in order to understand such components and the operation and performance of them in relation to the system of FIG. 1(*b*).

Detailed Description of The System of FIGS. 2(*a*) and (*b*), 3(*a*) and (*b*) and 4(*a*) and (*b*) Which are Accordance With the Present Invention Depending on the design of the thermodynamic cycle, different operation modes can be achieved with the following systems in accordance with the present invention, as will now be described and detailed.

Where the systems of FIGS. 2(*a*) and (*b*), 3(*a*) and (*b*) and 4(*a*) and (*b*) use the same components as those already described in relation to FIGS. 1(*a*) and 1(*b*), the same reference numerals are re-used and where those components are operated in the same manner, they will not be described again for the sake of brevity and therefore the reader is referred to the description hereinbefore provided in order to understand such components and the operation and performance of them.

As will be described in further detail below, in embodiments in accordance with the present invention, the synchronous machine 130 is configured to interchangeably operate in a bi-modal manner i.e. in either of:
i) a synchronous motor mode in which the synchronous machine 130 receives electrical motive power from the electricity grid 2 in order to drive the Stirling cycle machine 1\* (of the system of FIGS. 2(*a*) and 2(*b*)), **1\*\* (of the system of FIGS. 3**(*a*) and 3(*b*)) and **1\*\*\* (of the system of FIGS. 4**(*a*) and 4(*b*)) as a heat pump (for example during periods of surplus grid electricity availability); and
ii) a synchronous generator mode in which the synchronous machine 130 acts as a Stirling cycle machine 1\*, **1\*\* and 1\*\*\* driven generator 130 (in that the synchronous machine 130) is provided with mechanical/rotational power from the Stirling cycle machine 1\*, 1\*\* and 1\*\*\* to produce and feed electrical power back into the grid 2, as will be described in further detail below in relation to the embodiments shown in FIGS. 2**(*a*) and (*b*), 3(*a*) and (*b*) and 4(*a*) and (*b*).

In relation to the embodiments shown in FIGS. 2(*a*), 3(*a*) and 4(*a*), the electrical motor could be either of:
i) any suitable synchronous machine 130 (one example of which is a synchronous machine such as:
https://www.omemotors.com/electric-motors/synchronous-generators
offered by OME Motori Elettrici s.r.l. of Via Niccolò Tartaglia, 25064, Gussago, Italia); or
ii) any suitable asynchronous machine (also referred to as an induction motor) 130 (one example of which is a three phase asynchronous machine/induction motor such as:
https://www.electrotechdrives.co.uk/product/55-0kw-three-phase-electric-motor-74hp-2-pole-2800rpm-250-frame/
offered by Electrotech Drives Ltd of Dungannon, County Tyrone, BT71 6HD, Northern Ireland.

For brevity sake, only the synchronous machine 130 may be referred to below when discussing the embodiments shown in FIGS. 2(a), 3(a) and 4(a) (but the skilled reader will understand that it could be replaced by a suitable asynchronous machine 130).

Figure 2B:
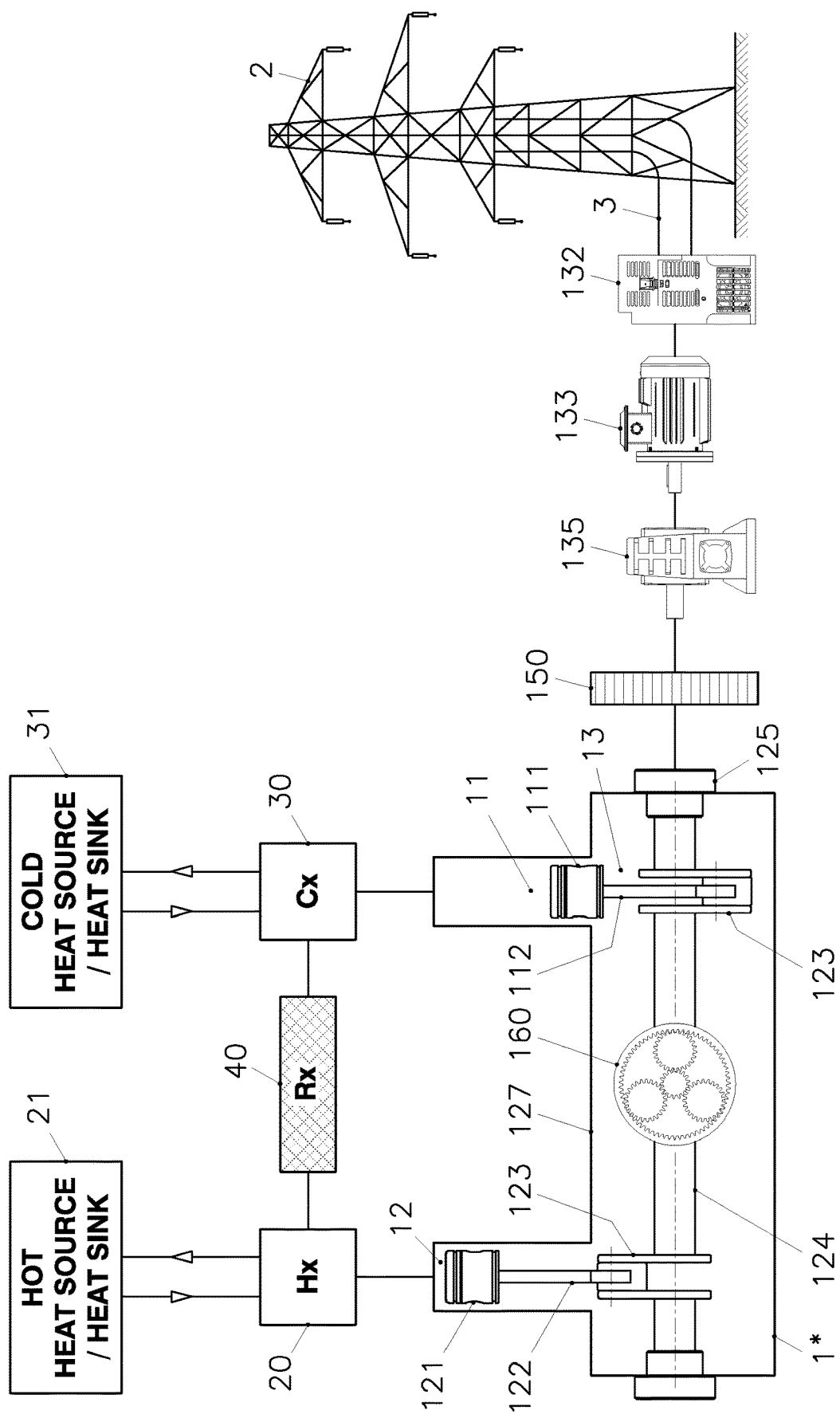
Figure 3B:
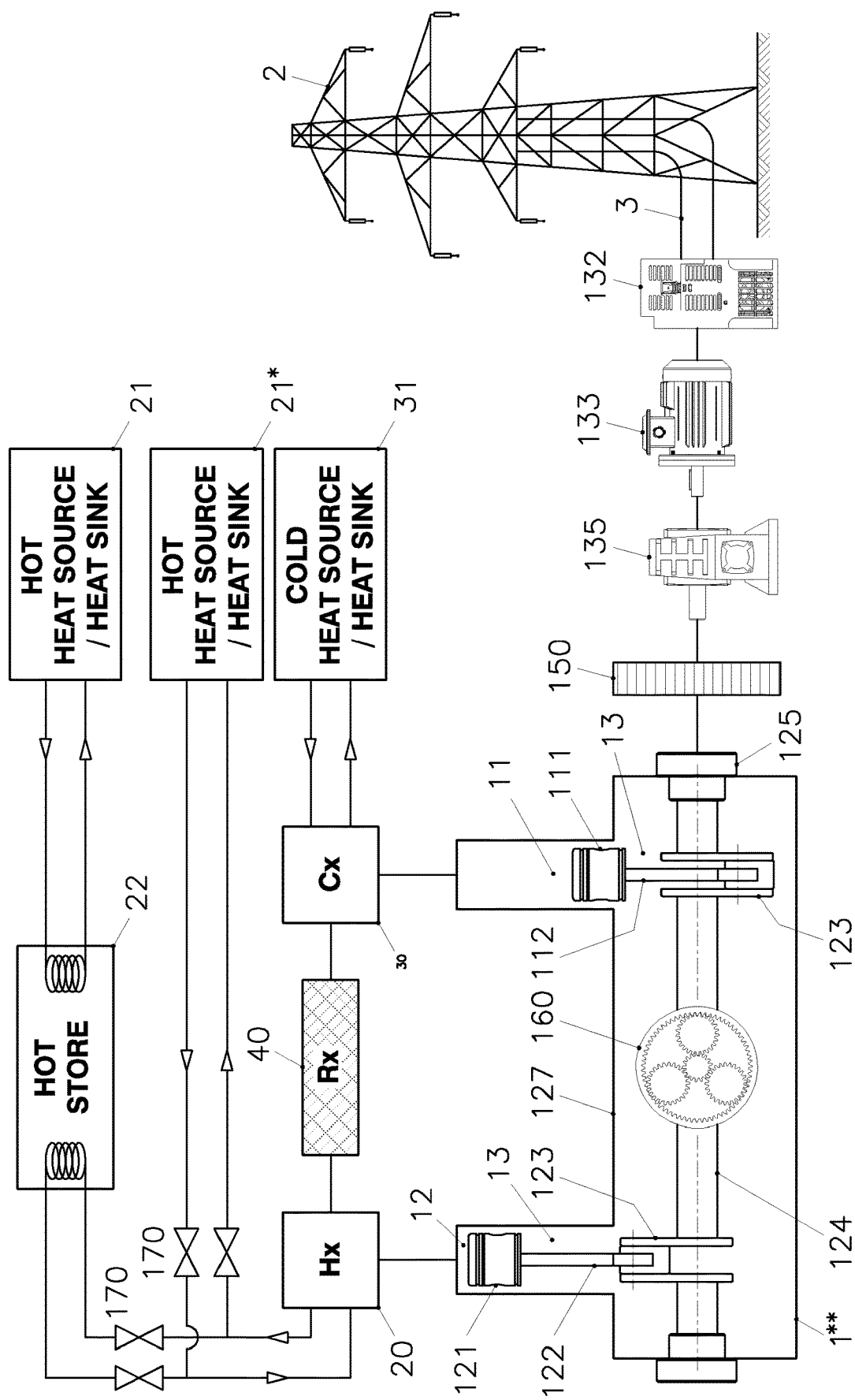
Figure 4B:
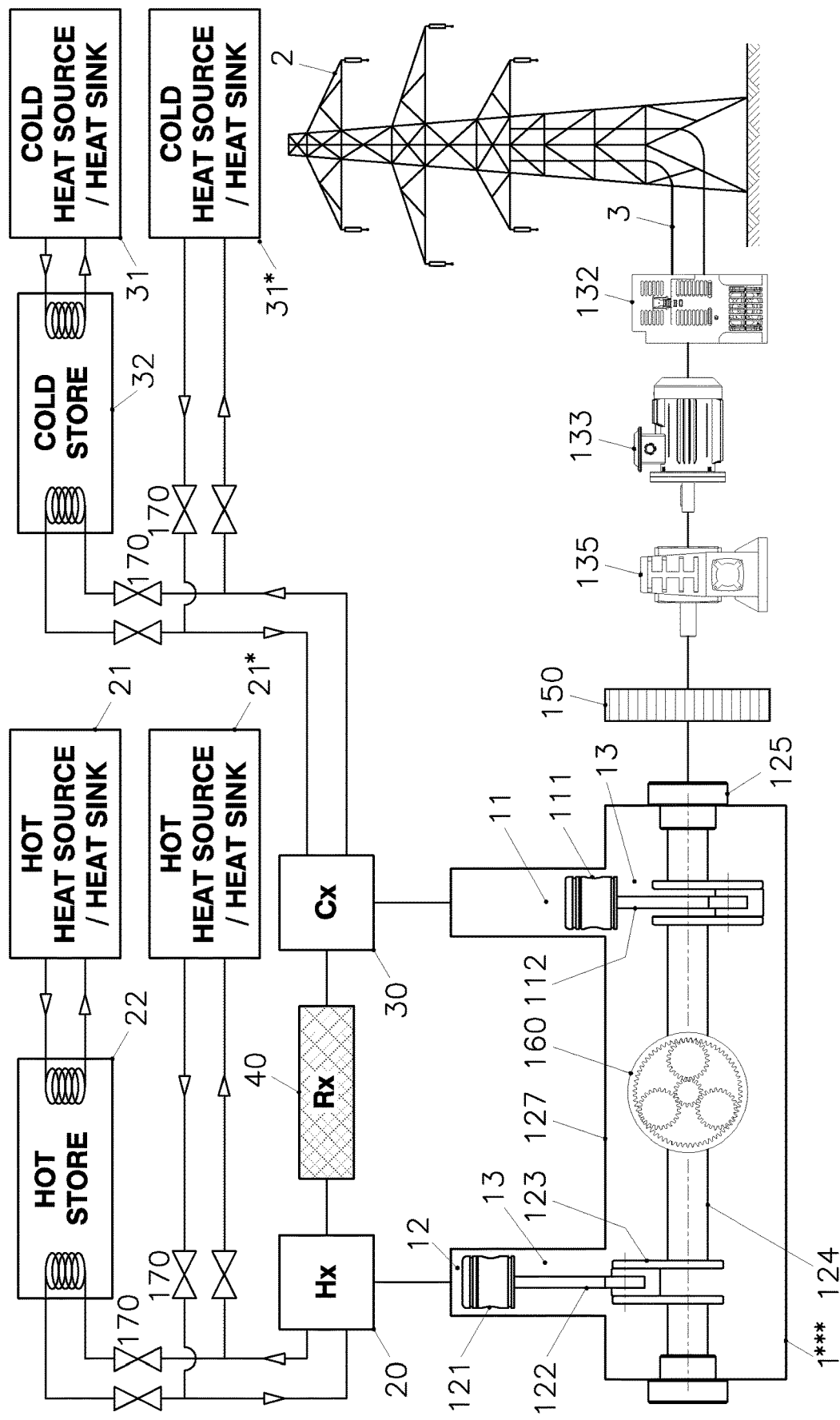

In relation to the embodiments shown in FIGS. 2(b), 3(b) and 4(b), the electrical motor could be any suitable asynchronous machine 133 (also referred to as an induction motor) 133 (one example of which is a synchronous machine such as:

https://www.omemotors.com/electric-motors/synchronous-generators offered by OME Motori Elettrici s.r.l. of Via Niccolò Tartaglia, 25064, Gussago, Italia).

In relation to the systems shown in FIGS. 2(a) and (b), 3(a) and (b) and 4(a) and (b), when disconnected from the Stirling cycle machine 1*, 1 and 1*, the synchronous motor 130 can act as a synchronous compensator 130 in an alternating current electricity distribution grid system 2. The synchronous motor 130 is always connected to the electrical grid 2. As a result, the synchronous motor 130 turns at a fixed frequency, depending on grid frequency and number of poles of the synchronous motor 130. In normal operation the synchronous motor 130 turns continually thus supplying rotational inertia to the grid 2. Each of the overall ancillary support systems shown in each of FIGS. 2(a) and (b), 3(a) and (b) and 4(a) and (b) can also be used in a DC distribution system if combined with a frequency converter, in a similar manner to wind turbines (not shown).

Optionally, a gearbox 135 is provided in the embodiments of the system in accordance with the present invention, where the gearbox is located in between and the rotary input of the gearbox 135 is physically coupled to the rotor of the motor 130 and the rotary output of the gearbox 135 is physically coupled to one side of the fly wheel 150 (if present—and if not present, then it can be coupled to one side of the clutch 140 if present, and if the clutch 140 is not present then can be coupled to the drive end 125. The gearbox 135 (if present) can be a fixed ratio gearbox, or in alternative embodiments can have either selectable ratios, or can have a continuously variable ratio.

Further optionally, a brake (not shown) or further clutch (not shown) may be provided to work in conjunction with the phase change device 160; the said optional brake or gearbox would function to hold the phase change device 160 in position until the phase change device 160 is required to operate (i.e. change the phase angle).

Detailed Description of the System of FIG. 2(a) Embodiment—Stirling Cycle Machine 1*

With reference to FIG. 2(a), there is shown a preferred and an exemplary system in accordance with the present invention as further comprising a phase change means 160 provided for the Stirling cycle machine 1*. Optionally, the phase change means 160 is operable in relation to the crankshaft 124 of the Stirling cycle machine 1* and is preferably a phase change device 160 typically located at a suitable point such as midway along the crankshaft 124 in between the pair of crank pins 123, such that one side (or half) of the crankshaft 124 can be rotated with respect to the other side (or half) of the crankshaft 124 to change the phase angle therebetween.

Such a phase change device 160 could either be a mechanical phase change device such as an epicyclic gearbox or the like or could be a suitable hydraulically actuated/operated phase change device (not shown).

Alternatively, the phase change device 160 could be an electric motor control phase change device where each half of the drive shaft or crankshaft 124 is connected to an independently controlled electric motor (not shown) which can control the phase angle of each crankshaft half and where an electronic control system (not shown) typically controls the rotation of each crankshaft half to control the phase angle of the respective compression and expansion spaces 11, 12 on a real time basis. This is typically achieved by providing each half or portion of the crankshaft 124 with a crankshaft angle sensor or encoder 126L; 126R (e.g. an absolute position sensor) provided thereon (see FIG. 5(b)), where the data output of the crankshaft angle sensor 126L; 126R is input into the overall control system which comprises (at its heart) a Programmable Logic Controller PLC 350. The PLC 350 would thus be provided with the phase angle for each crankshaft 124 half or portion and therefore knows the angle between the two crankshaft 124 halves or portions. Such an alternative embodiment would have the advantage of considerably shortening the gap between the two halves of the crankshaft 124 (because the said electric motors could be provided on the outer end thereof) and that would provide efficiency savings for the Stirling cycle machine 1* because it is more efficient to have the gap between the hot side heat exchanger (Hx) 20 and the cold side heat exchanger (Cx) 30 to be as short as possible. Alternatively, the two independently controlled electric motors could be coupled electrically (e.g. a sel-syn/selsyn or synchro arrangement) or, more likely, could be coupled electronically (e.g. brushless dc motors and power electronics arrangement (not shown)).

In other embodiments, the crankshaft 124 is not split in half with each half being coupled to one another via e.g. an epicyclic gearbox 160 but rather there are two separate crankshaft portions (not shown) being powered by two separate electrical motors 130 (i.e. one electrical motor 130 powers one crankshaft portion for e.g. the "hot" side of the Stirling cycle machine 1*, 1, 1* and another electrical motor 130 powers the other crankshaft portion for e.g. the "cold" side of the Stirling cycle machine 1*, 1, 1*) which are connected via power electronics, where one electric motor 130 is coupled to power each respective crankshaft and thus by providing an encoder 126L; 126R on each crankshaft portion, the control system or more specifically the PLC 350 exactly knows the phase angle for each crankshaft portion and the PLC 350 of the control system can instruct one of the said separate electric motors 130 to slow down to go from e.g. 90° to 120° phase change angle and can then speed that crankshaft portion up to match the other crankshaft portion speed once the new phase angle has been reached.

Overall, the phase change means 160 changes the phase shift between the volumetric variations of the compression and expansion spaces 12, 11 in the Stirling cycle machine 1*. Because the synchronous machine 130 is connected to the grid 2 and always turns in the one direction, provision of the phase change means 160 facilitates changes between different operating modes without changing the synchronous machine's 130 direction of rotation. The different operation modes can be therefore be changed for the embodiment of FIG. 2(a) without changing heat sources and heat sinks 21, 31 at the heat exchangers 20, 30. The phase change device 160 makes it possible to change the phase angle continuously during operation. Advantageously, through use of the phase change means 160, the flow of heat in the system can be reversed without stopping the Stirling cycle machine 1*, but rather keeping it turning in the same direction. Thus the direction of rotation of the crankshaft 124 remains unchanged (although the relative angle between the two sides of the crankshaft 124 may be changed by the phase change device 160 causing relative rotation there between) as the Stirling cycle machine 1\* changes mode from heat pump to heat engine and vice versa.

The operation modes associated with the system of FIG. 2(*a*) are:
a) heat mode (in which it is converting rotational mechanical/kinetic energy input into the crankshaft 124 (which itself is rotated by the electrical motor 130 converting electrical energy from the national grid 2 into rotational mechanical/kinetic energy of the rotor of the electrical motor 130) into hot heat which is input into the hot heat exchanger Hx 20 and/or cold heat which is input into the cold heat exchanger Cx 30—and the phase change device 160 is used to change the operation of the Stirling cycle machine 1\* between the heating heat pump mode and the cooling heat mode (in both of which modes the Stirling cycle machine 1\* is driven by the electrical machine 130) by changing the phase angle relatively seamlessly, and without having to reverse the direction of rotation of the input/output drive end 125 of the Stirling cycle machine 1\* (in preferred such embodiments, the electrical machine 130 is typically an asynchronous electrical machine 130 but which could also be a synchronous machine 130);
b) heat engine mode (i.e. also known as engine mode, generation mode or electricity generation mode) (in which it is converting hot heat which is output from the hot heat exchanger Hx 20 and/or cold heat which is output from the cold heat exchanger Cx 30 into rotational mechanical/kinetic energy input into the crankshaft 124 and which rotates the electrical motor 130 to produce electricity); or
c) idling mode (in which it is not converting any significant or meaningful amount of energy).

The phase change device 160 can also be used as a throttle to control the output of the heat pump or heat engine. Advantageously, this reduces stop-start cycling that can reduce the efficiency of other, prior art or conventional, heat pumps. Use of a phase change means 160 advantageously enables tuning for maximum efficiency or power (e.g. thermal or mechanical output) in each of the operation modes (i.e. in finding an optimal working point). In turn, this makes it more practical to connect and switch between different heat sources and heat sinks. The option of using motor 130 as a synchronous compensator when the engine is declutched is unaffected.

FIG. 6 is a graph showing a typical relationship between phase angle and power output (on the left hand scale)/coefficient of performance (COP) (on the right hand scale) of a Stirling cycle machine 1\*, **1\*\*, 1\*\*\* having a phase change device such as that shown in FIG. 2**(*a*) (and also FIGS. 2(*b*), 3(*a*) and (*b*) and 4(*a*) and (*b*)) in accordance with the present invention.

Surprisingly, it has been realised that an additional benefit of including the phase change device 160 is that when it is adjusted (e.g. by the control system) to make the phase angle smaller, the result is an increased power output for the Stirling cycle machine 1\*. Even more surprisingly, that reduction in the phase angle also increases the pressure of the working fluid and in doing so provides a yet further increase in the power output for the Stirling cycle machine 1\*. This provides very significant benefits to the present invention and is shown in the graph of FIG. 6. This is now described in more detail.

Effect of Phase Change on Mean Cycle Pressure

In addition to the effects previously described, changing the phase angle with the phase change device 160 also changes the mean gas pressure in the working phase and that effect is very beneficial. For example, if a machine is operating near peak COP (efficiency), the phase angle may be close to (say) 140° (see the right hand scale in FIG. 6 and the graphline referenced as COP). If the phase angle is reduced to (say) 90° in response to a call for increased thermal output, the average gas pressure in the gas circuit of the working fluid (i.e. that working fluid located in the compression 12 and expansion 11 spaces and all interconnecting pipework including the hot side heat exchanger (Hx) 20, a cold side heat exchanger (Cx) 30 and the internal heat exchanger or 'regenerator' (Rx) 40) will increase. This pressure increase also increases the thermal output of the machine (see the left hand scale in FIG. 6 and the graph line referenced as "Heat Output (W)"). Therefore, the increased thermal output arises from two sources:
(1) from the effect of the reduced phase angle, and
(2) due to the increased mean cycle pressure that occurs as a side-effect of reducing the phase angle.

The phase change device 160 therefore allows the user to change the power output and COP of the heat pump (i.e. the Stirling cycle machine 1\*, **1\*\*, 1\*\*\*). For example, high power outputs can be achieved at the expense of reduced COP, and high COP can be achieved at the expense of reduced thermal output. In this way, users can 'trade' thermal output and COP using a control algorithm resulting in a compact and economical Stirling cycle machine 1\*, 1\*\*, 1\*\*\*. In other words, the phase change device 160** can be used to trade off heat/thermal output vs efficiency. This is especially useful for those connected to air source machines.

A heat pump system incorporating a Stirling cycle machine that usually operates close to peak power tends to be relatively small and inexpensive. This type of installation has minimum initial cost but is usually unable to significantly increase output in response to unexpectedly adverse conditions.

A heat pump system incorporating a Stirling cycle machine that usually operates close to peak efficiency tends to be relatively large and cost more. However, it can significantly increase thermal output-beyond its nominal rating-at the expense of COP. This type of heat pump system installation has higher initial cost but likely has lower running costs. It is also highly unlikely to be overwhelmed by extremely low ambient temperatures or minor errors in system design and installation-a common problem with heat pump systems which incorporate air source machines. In addition, a heat pump system could be specified between these two abovementioned extremes and that would result in reasonably compact installation that can increase output somewhat in response to extreme conditions (cold weather or unexpected heat loss from the building). This provides some 'margin' to allow for deficiencies in system design or installation.

The graph shown in FIG. 6 shows that COP tends to 'drop off a cliff' at very high, and very low, phase angles. It is, therefore, not efficient to operate such a heat pump system in this way. One approach to dealing with low thermal demand is to operate intermittently. This is the normal 'on/off' operating mode of conventional heating systems.

Another way to control the heat output by the heat pump system is by changing the regenerative thermal machine's running speed. This can be done using a variable frequency device supply or a mechanical gearbox.

Another way to control the heat output by the heat pump system is by using one or both of a combination of a phase change device 160 (which is in accordance with the present invention) and speed control. This avoids the 'cliff edge' extremes of the COP curve; when the 'cliff edge' is approached, the control algorithm of the PLC 350 prioritises speed change over phase change to maximise efficiency.

The control system incorporating the PLC 350 could, for example:
- Switch the Stirling cycle machine 1*, 1, 1* on and off;
- Operate the clutch 140 (if present);
- Operate the phase change device 160;
- Change the Stirling cycle machine 1*, 1, 1* running speed;
- Engage, or bypass, thermal stores 22; 32;
- Engage, or bypass, heat sources and heat sinks 21; 31; and
- Operate the electronic valves utilised in WO2014/135895A1 to Whittaker Engineering (Stonehaven) Limited (if that preferred Stirling cycle machine is used).

These changes would be driven by control algorithms stored and processed in PLC 350 that could include machine (i.e. AI) learning to seek to optimise, for example, electricity consumption based on measured data. This system could also be connected to a 'smart grid' via the internet and may seek to achieve other objectives set by the electricity network operator. This is especially relevant for versions that also provide ancillary services to the electricity network 2.

The heat pump system utilising a Stirling cycle machine 1*, 1, 1* having a phase change device 160 such as that shown in FIG. 2(a) (and also FIGS. 2(b), 3(a) and (b) and 4(a) and (b)) in accordance with the present invention can be used in conjunction with thermal energy storage 22; 32 and demand side response. For example, the heat pump system could charge a thermal battery 22 at a high rate when electrical demand is low, and then extract thermal energy from such a thermal battery 22 at a rate that exceeds the charge rate when electrical demand is high.

Finally, in air source applications, the phase change device 16—can be used to temporarily reverse the direction of heat flow to the external heat exchanger. This feature can be used to combat frost build-up on the external heat exchanger 306—a common problem with existing conventional air source heat pumps.

These features combine to overcome many of disadvantages of existing air source heat pumps. Therefore, it is anticipated that embodiments of heat pump systems utilising a Stirling cycle machine 1*, 1, 1* having a phase change device 160 such as that shown in FIG. 2(a) (and also FIGS. 2(b), 3(a) and (b) and 4(a) and (b)) in accordance with the present invention will make air source heat pumps viable in applications that would otherwise be unsuitable. A typical example would be an existing building 255 where installation of underfloor heating is too expensive, in that embodiments of heat pump systems utilising a Stirling cycle machine 1*, 1, 1* having a phase change device 160 such as that shown in FIG. 2(a) (and also FIGS. 2(b), 3(a) and (b) and 4(a) and (b)) in accordance with the present invention may allow existing radiators of the building 255 to be retained, particularly in cases where underfloor heating is difficult to install.

Utilisation of embodiments of heat pump systems utilising a Stirling cycle machine 1*, 1, 1* having a phase change device 160 such as that shown in FIG. 2(a) (and also FIGS. 2(b), 3(a) and (b) and 4(a) and (b)) in accordance with the present invention would also avoid the need for extensive earthworks to install the ground loop required by ground source machines.

For this reason, the overall cost of embodiments of heat pump systems utilising a Stirling cycle machine 1*, 1, 1* having a phase change device 160 such as that shown in FIG. 2(a) (and also FIGS. 2(b), 3(a) and (b) and 4(a) and (b)) in accordance with the present invention is likely to be lower for difficult applications where a ground source machine was previously the only viable option.

As discussed herein, there are many different types of regenerative thermal machine that could be used instead of a Stirling cycle machine 1*, 1, 1* and still accord with the present invention. Indeed, for the domestic (lowest cost) arrangement as described herein (i.e. the "RELATIVELY SIMPLE VERSION" described below, a Wankel type rotary version (not shown) is likely to be most useful because they are lower cost and more compact and smoother and quieter than reciprocating piston/cylinder type Stirling cycle machines 1*, 1, 1*.

It should also be noted that the phase change device 160 works particularly and surprisingly well at optimising the Stirling cycle machine 1*, 1, 1* as the outdoor temperature changes.

In addition, preferred embodiments of the heat pump system in accordance with the present invention will likely have a combination of:
a) using the phase change device 160 to throttle the Stirling cycle machine 1*, 1, 1* (particularly depending on the outdoor temperature to maintain the efficiency and fine tune the Stirling cycle machine 1*, 1, 1*); and
b) change the speed of the Stirling cycle machine 1*, 1, 1* to increase or decrease the power output by provision of a speed controller and associated sensors to be able to control the speed controller.

Optionally, the phase change means 160 comprises an epicyclical gearbox 160.

Optionally, the phase change means may comprise any one or more of a stepper motor, brake and/or suitable electrically, mechanically, hydraulically or pneumatically actuated mechanisms.

As described previously in relation to FIG. 1(a), the Stirling cycle machine 1* can run in the opposite direction, which is the equivalent of a 180° phase shift, and operate as a heat pump. However, if designed to be an optimised heat pump, the engine mode, after a 180° phase shift, will be very inefficient. The same applies vice versa. Provision of the phase change means 160 in the present example of the invention as shown in FIG. 2(a) has the great advantage that it enables the phase angle (i.e. the relative angle between the two sides of the crankshaft 124) to be changed by an angle other than 180°. Thus provision of the phase change means 160 enables phase shifting to be a tuneable parameter, for example in order to attain the optimal working points in both heat pump and engine operating modes. In this way, an otherwise inefficient Stirling cycle machine can be made a more efficient Stirling cycle machine 1*.

Additionally, it is possible with embodiments of the present invention for the user and/or the control system to change the speed of the Sterling engine 1* (and the Sterling engines 1, 1* in the subsequently described embodiments) by (assuming a constant load) applying more (or less) heat to the hot heat exchanger (Hx) 20 to speed up (or slow down respectively) the Sterling engine 1* in addition to or instead of using the phase change device 160 to change the phase angle and therefore that change in application of heat to the hot heat exchanger (Hx) 20 can be considered to provide an additional form of speed control over the Sterling engine 1*. Accordingly, the control system can be provided with suitable temperature sensors TT in relation to the hot heat exchanger (Hx) 20 and can also be provided with suitable control over the application of heat to the hot heat exchanger (Hx) 20 (e.g. in terms of a thermostat and is also provide with a suitable speed sensor in relation to the crankshaft 124/portions of the crankshaft 124, in order to provide a feedback control system over the Sterling engine 1* and optionally make it interactive with the national grid 2.

The skilled person will realise that synchronous motor 130 would require additional hardware to start from rest, so the preferred arrangement would be to run synchronous motor 130 continuously and declutch with the clutch 140 when heating or cooling is not required. If a gearbox 135 is included, it may be fixed or variable ratio. Alternatively, it could consist of individually selectable ratios, or the gear ratio could be continuously variable. When declutched, the Stirling cycle machine 1* can operate as a synchronous compensator.

The flywheel 150 is optional but if present, can be used to add inertia to the heat pump system of FIG. 2(*a*), particularly if the inertia of the other rotating parts is not sufficient.

The Stirling cycle machine 1* can operate as a heater or a cooler and can change seamlessly between the two modes using the phase change device (e.g. in the form of the epicyclic gearbox 160). Other phase change devices 160 or methods of changing the phase angle could also be used.

When operating as heater, low temperature heat is drawn from outside the building 255 (e.g. air or ground source) and high temperature heat is delivered to the building (e.g. radiators 300 or hot water cylinder 275; 260).

The embodiment of heat pump system shown in FIG. 2(*a*) cannot operate as a generator because there is no thermal energy storage (unlike the heat pump systems shown in FIGS. 3(*a*), 3(*b*), 4(*a*) and 4(*b*) which do have a heat store 22).

The system of FIG. 2(*a*) advantageously has the advantageous applications as listed above with respect to the system of FIGS. 1(*a*) and (*b*) but likely with greater efficiency, but through provision of a phase change means 160, further advantageous applications and implementations include, but are not limited to:

13) Increasing efficiency of heat pump in winter (i.e. optimising the efficiency of an air source heat pump to compensate for changes in outside air temperature) or by changing heat source from air source (e.g. at 5° C.) to ground loop (e.g. at 10° C.) and tuning the phase angle to compensate for different temperature difference between heat source and heat sink (e.g. a radiator at 75° C.).

14) Increasing efficiency of heat pump in summer, by changing heat source from ground loop (e.g. at 10° C.) to air source (e.g. at 18° C.) and tuning the phase angle to compensate for temperature difference between heat source and heat sink (e.g. a radiator at 75° C.).

15) Holiday mode, by running the system at lower output but higher efficiency through phase angle adjustment. The temperature difference between source and sink will be smaller and therefore the system more efficient. The phase angle can be adjusted to guarantee the optimum working point of the heat pump for the new temperature difference.

16) Optimum working point for heat pump and engine by for example actuating or otherwise moving the phase change device 160 to find the optimum working point/ efficiency.

17) Idling. A phase angle can be chosen such that the heat pump will place almost no load on the synchronous machine 130. This is a standby mode which keeps the heat pump turning at minimal load, and which can be switched back to full heating in an instant.

18) Throttling output. For example, keeping a thermal store 'topped up', i.e. just offsetting thermal losses and/or reducing stop/start cycles.

The system of FIG. 2(*a*) advantageously provides more flexibility over the system of FIGS. 1(*a*) and 1(*b*) and can cover more services and adapt to changes in load or heat sink and source temperatures. In addition, the embodiment of the system of FIG. 2(*a*) particularly lends itself to integration with a 'smart grid' typically via a network connection (either wireless or wired) to the internet because it is able to participate in many different ancillary services. Moreover, the embodiment of the system of FIG. 2(*a*) has the advantage that it can be run in engine/generator mode (by using its stored heat as a source of fuel) in order to export electricity back into the national grid 2.

Detailed Description of the System of FIG. 2(*b*) Embodiment—Stirling Cycle Machine 1*

The embodiment of the system of FIG. 2(*b*) is the same as that of FIG. 2(*a*) except for the following:

The FIG. 2(*b*) embodiment of system has a suitable Variable Frequency Drive (VFD) 132 (one example of which is an ATV 630 Inverter Drive VFD offered by Schneider Electric Ltd of London, SW1E 5JL, United Kingdom) (instead of a clutch) and has an asynchronous motor 133 which is provided with its power by the VFD 132. The VFD 132 is located (and is also electrically connected) in between the asynchronous motor 133 and the interconnector 3 of/to the national grid 2.

The embodiment of the system of FIG. 2(*b*) does however have the disadvantage that it cannot be run in engine/ generator mode in order to export electricity back into the national grid 2 by using its stored heat as a source of fuel due to the presence of the VFD 132 (because the presence of the VFD prevents such electricity generation and export); in any event, unlike the heat pump system shown in FIGS. 3(*a*), 3(*b*), 4(*a*) and 4(*b*), the system shown FIGS. 2(*a*) and (*b*) doesn't have a heat store and therefore that is also another reason why it can't be used as an electricity generator to the national grid 2. In addition, the system shown FIG. 2(*b*) doesn't have the ability to operate as a synchronous compensator when declutched.

The further disadvantage of the embodiment of the system of FIG. 2(*b*) which incorporates a VFD 132 is, as many of such systems (e.g. thousands, hundreds of thousands or even millions of them are connected to the national grid 2 via respective interconnectors 3) come online, they become a problem to the national grid 2 because they decouple the asynchronous motors 133 from the electricity network (i.e. the grid 2) that powers them. For example, if the national grid 2 supply frequency or voltage were to fall, the VFD 132 would try to pull the same power from the grid network 2 regardless. It would do this by drawing more current to make up for the falling voltage, which would make things even worse for the supply grid network 2. Also, VFD's 132 do not provide an inertial response to a grid 2 which may be required in case of e.g. a black start. (All that said, and as an aside, the skilled person will realise that, whilst it's correct to say that adoption of large numbers of VFD's 132 is likely to pose a problem to the electricity network/national grid 2, it is worth noting that this problem is not unique to embodiments of the present invention but rather all existing vapour compression machines (not shown) with VFD's have the same disadvantage. On the other hand, the phase change device 160 of the present invention overcomes this problem).

This is in contrast the system of FIG. 2(*a*) which can be regarded as achieving at least the same functionality as a VFD 132, but the system of FIG. 2(*a*) also keeps the motor 130 electromagnetically coupled to the national grid 2 supply and therefore can provide an inertial response to the grid 2 in case of e.g. black start or even just stabilising the grid 2. Therefore, the stabilising response of the electric motor 130 (either asynchronous or synchronous) is retained. Accordingly, it can be considered that whilst it's inevitable that heat pumps (e.g. the Stirling cycle machine 1*, 1, 1** when operating in heat pump mode) will increase electrical demand from the grid 2, the embodiments of the present invention and particularly those of FIGS. 2**(*a*), 3(*a*) and 4(*a*) provide benefits that conventional 'state of the art' systems cannot.

Detailed Description of the System of FIG. 3(*a*) Embodiment—Stirling Cycle Machine 1**

With reference to FIG. 3(*a*), there is shown a system in accordance with the invention in which it shares many components and consequent advantages in which, compared with the system of FIG. 2(*a*) there is further provided a thermal or 'hot' store 22. Hot store 22 enables the system to store thermal energy. Only one hot store 22 is shown, however it will be understood that a plurality of hot stores may be employed.

In use, hot store 22 works as a heat battery. Optionally, hot store 22 comprises a hot water tank or tanks. More preferably, hot store 22 comprises one or more Phase Change Material (PCM) batteries; batteries utilising PCM are preferred as they require less volume. PCMs store heat around a selected melting point temperature. The stable temperature level of a PCM battery allows for a more efficient operation of the Stirling cycle machine 1** (whether operating in engine mode or heat pump mode).

In FIG. 3, hot store 22 is connected intermediate the hot side heat exchanger Hx 20 and the heat reservoir 21.

When heat is pumped upstream, heat is extracted from the cold reservoir 31 and can be stored in the hot store 22. When running in engine mode, heat is extracted from the hot store 22 and dissipated in the cold reservoir 31, while generating electric power by means of the rotational output of the Stirling cycle machine 1 rotating the synchronous motor 130 to produce electricity which can be fed into the national grid 2. Multiple heat sources and heat sinks 21** can be connected to the heat stores.

If hot store 22 is full, by means of valves 170 or other suitable fluid diverters, the hot side heat exchanger Hx 20 can be disconnected from the hot store 22 and can be connected to another hot store or an additional/other heat source 21* as shown by way of example in FIG. 3. In this arrangement, different hot stores 22 can be charged at different temperatures and different heat stores can be connected should the capacity be reached.

As described previously, the phase change means 160 also permits switching between operation modes: pumping upstream, engine mode and a "top up" mode. For example, if the hot store 22 is full, phase change means 160 permits changing of the phase angle to provide a "top up mode", providing just enough heat to offset the heat losses in the hot store 22.

The system and Stirling cycle machine 1 of FIG. 3 has the same advantageous applications as listed above with respect to the systems of FIGS. 2**(*a*) and 2(*b*), but through provision of added hot storage further advantageous applications and implementations include, but are not limited to:

18) Off-peak charging, whereby hot store 22 can be charged efficiently overnight in heat pump mode when electricity tariffs are low, and discharged when electricity tariffs are high, for example during the day when heating and hot water demands are greatest.

19) Generation and heating at the same time, by drawing heat from the hot store to generate power for the national grid 2 while in engine mode and simultaneously supplying heat for other uses, such as domestic heating or hot water.

20) Synchronous compensation and heating at the same time. When the hot store is full, the hot store can provide heating while the Stirling cycle machine 1 is declutched for the synchronous machine 130 to be used as a synchronous compensator, or to generate electrical power at the synchronous machine 130 when the Stirling cycle machine 1** is running in engine mode. Thus, should a grid operator request power generation, the Stirling cycle machine 1** can change phase angle to effect engine mode, while space heating and hot water are still available to a domestic user from the hot store 22**.

21) Storing heat from cooling, whereby heat extracted from the likes of freezer or air conditioning units, or from a ground source, can be pumped upstream and stored in the hot store and used for other applications. Additionally, heat can be pumped downstream from the likes of a building in summer or air conditioning units to a ground source.

In addition, with the system and the Stirling cycle machine 1 of FIG. 3**(*a*), several users may access the hot store 22 simultaneously, for example for space heating and hot water provision. Furthermore, storing heat is efficient and inexpensive and is available for use at any time.

Accordingly, in addition to the features of the heat pump system of FIG. 2(*a*), the embodiment shown in FIG. 3(*a*) can decouple high-temperature heat delivery and electricity consumption. For example, it could charge the thermal store 22 when electricity is cheap, then discharge it later when electricity is expensive. The heat pump system of FIG. 3(*a*) can also operate as a cooler, similar to the heat pump system of FIG. 2(*a*), by using valves to connect the cold heat source/heat sink 31 to the inside of the building 255. In this case, heat is extracted from the building 255 and used to charge the hot store 22. If the thermal store 22 is charged to a sufficiently high temperature, this embodiment can also generate electricity by using the phase change device 160 to shift from heat-pump mode to heat-engine or electricity generation mode. The hot store 22 therefore supplies the energy needed to drive the Stirling cycle machine 1** in heat-engine or electricity generation mode.

Thus, the skilled person will appreciate that the system of FIG. 3(*a*) provides additional operational flexibility over that shown in FIG. 2(*a*).

Detailed Description of the System of FIG. 3(*b*) Embodiment—Stirling Cycle Machine 1**

The embodiment of the system of FIG. 3(*b*) is the same as that of FIG. 3(*a*) except for the following:

The FIG. 3(b) embodiment of system has a suitable Variable Frequency Drive (VFD) 132 (instead of a clutch) and has an asynchronous motor 133 which is provided with its power by the VFD 132. The VFD 132 is located (and is also electrically connected) in between the asynchronous motor 133 and the interconnector 3 of/to the national grid 2, and therefore similar advantages and disadvantages in that regard to the FIG. 2(b) embodiment of system hereinbefore described.

The heat pump system shown FIG. 3(b) is likely to be lower cost than that of FIG. 3(a) and therefore may be more suited to a domestic building 255 rather than a commercial or industrial building 255 but the heat pump system shown FIG. 3(b) doesn't have the ability to operate as a synchronous compensator when declutched.

Detailed Description of the System of FIG. 4(a) Embodiment—Stirling Cycle Machine 1***

With reference to FIG. 4(a), there is shown an exemplary system in accordance with the invention in which there is further provided a cold store 32. The system incorporating Stirling cycle machine 1* of FIG. 4(a) is a development of the system of FIG. 3(a), with the addition of a cold store 32. Cold store 32 enables the system to supply cold at any time, even if the Stirling cycle machine 1* is not pumping heat. Only one cold store 32 is shown, however it will be understood that a plurality of cold stores may be employed.

Optionally, cold store 32 comprises one or more Phase Change Material (PCM) batteries. In use, cold store 32 works similarly to hot store 22, but employs a different PCM with a different melting point. For example, cold store 32 could be a water/ice store, which operates at 0° C.

In FIG. 4(a), cold store 32 is shown connected intermediate the cold side heat exchanger Cx 30 and the cold reservoir 31.

The phase change device 160 enables the Stirling cycle machine 1* system of FIG. 4(a) to switch between operation modes: pumping upstream, engine mode and top up mode.

When heat is pumped upstream, heat is extracted from the cold store 32 and stored in the hot store 22. When running in engine mode, heat is extracted from the hot store 22 and dissipated in the cold store 32, while generating electric power.

Multiple heat sources and heat sinks 21 can be connected to and disconnected from the heat stores. For example, equipment such as but not limited to air conditioning units could be connected to the cold store 32, with the cold store absorbing their heat. This heat can then then be pumped into the hot store 22. Alternatively, the cold store 32 could be used as a source of low temperature for cooling devices such as air conditioning units. This functionality additionally mean that different heat stores can be connected in case the capacity is reached or to charge at different temperatures.

If the cold store 32 is full (i.e. all PCM solid), but more heat is needed to fill the hot store 22, another heat source could be connected to the cold heat exchanger Cx 30, or heat could be leaked into the cold store 32 to melt some of the PCM.

Using both hot 22 and cold 34 stores, optionally employing PCMs means that the temperature gradient between the hot and cold sides is stable. Advantageously, this allows the system to run at its optimal operation point. Conveniently, heating and cooling are always available even when declutching the Stirling cycle machine 1* or when generating power.

The system of FIG. 4(a) has the advantageous applications as listed above with respect to the systems of FIGS. 2(a) and 3(a), but through provision of added cold storage 31* provides the additional advantage of cold availability at any time. Thus, the heat pump system of FIG. 4(a) provides a most flexible configuration.

Accordingly, the heat pump system of FIG. 4(a) is the most feature packed version. In addition to all the features outlined above, the heat pump system of FIG. 4(a) can decouple delivery of both high-temperature and low-temperature heat from electricity consumption and this could be especially useful in industrial applications that require both heating and cooling (e.g. an application requiring both space heating and refrigeration).

Detailed Description of the System of FIG. 4(b) Embodiment—Stirling Cycle Machine 1***

The embodiment of the system of FIG. 4(b) is the same as that of FIG. 4(a) except for the following:

The FIG. 4(b) embodiment of system has a suitable Variable Frequency Drive (VFD) 132 (instead of a clutch) and has an asynchronous motor 133 which is provided with its power by the VFD 132. The VFD 132 is located (and is also electrically connected) in between the asynchronous motor 133 and the interconnector 3 of/to the national grid 2, and therefore similar advantages and disadvantages in that regard to the FIG. 2(b) and FIG. 3(b) embodiments of system hereinbefore described.

Detailed Description of Control System for Embodiments of the Heat Pump of the Present Invention Systems as Shown in FIGS. 2(a) and (b), 3(a) and (b) and 4(a) and (b)

FIG. 5(a) shows one half and FIG. 5(b) shows the other half of the components/sensors and FIG. 5(c) shows a schematic diagram of the thermostats 335; 340 and the Programmable Logic Controller (PLC) 350 which can be considered as the heart or brain of the control system) which together form an embodiment of a controller and/or a control system for connection with and to provide control over the hot heat exchanger (Hx) 20 of the system of FIGS. 2(a) and (b), 3(a) and (b) and 4(a) and (b) and also the Stirling cycle machine 1*, 1* and 1* and other components such as the electrical motor 130, clutch 140 (if present), and VFD 132 (if present) as well as the valves 170, cold side heat exchanger Cx 30 and in some embodiments the hot 21 and cold 31 heat sources/heat sinks and//or the hot 22 and/or cold 32 stores, in order to provide a feedback control system which can control many/all aspects of operation of the Stirling cycle machine 1*, 1* and 1* and optionally enable it to interact with the national grid 2.

Specifically, FIG. 5(a) generally shows the hot heat exchanger (Hx) 20 (of the system of FIGS. 2(a) and (b), 3(a) and (b) and 4(a) and (b)) (on the right hand side of FIG. 5(a)) and being connected to a water heating system 250 for a building 255 (shown on the left hand side of FIG. 5(a)).

The skilled person will realise that the water heating system 250 for the building 255 is just one example of a possible system and will further realise that different buildings 255 will have different water heating systems 250 as per their requirements in relation to the size of the building 255, the size of the rooms therein, the number of rooms therein, the use of the rooms therein and consequent heating requirements thereof.

The exemplary water heating system 250 for the building 255 of FIG. 5(a) has a number of components namely:
  i) a buffer tank 275 which is fed a heating medium such as hot water on demand directly from the hot heat exchanger (Hx) 20 via a flow meter 280 and pump 285; there may be a temperature sensor (not shown in FIG. 5(a)) provided for the buffer tank 275 which provides a data output representative of the temperature of the hot water stored within the buffer tank 275;
  ii) a hot water tank 260 which is fed cold water on demand from a mains cold water supply 265 and which can heat said cold water by means of a suitable heating coil 270 which is supplied with hot water via either:
  the buffer tank 275; or
  directly from the hot heat exchanger (Hx) 20 via the flow meter 280 and the pump 285;
  iii) one or more domestic hot water taps 290 can be operated by the user to draw hot water from the hot water tank 260;
  iv) workshop heaters 295 located within a workshop 296 located within or outwith the building 255 are supplied with hot water from the buffer tank 275 via a pump 297 as required, with the exhaust hot water from the workshop heaters 295 being returned to the buffer tank 275;
  v) one or more office heater/coolers 300 located within an office 301 located within or outwith the building 255 is/are supplied with hot water from the buffer tank 275 via a pump 302 and a non-return valve 303 as required, with the exhaust hot water from the heater/cooler 300 being returned to the buffer tank 275;
  vi) a manifold 310 for directing exhaust hot water from either or both of the buffer tank 275 and the hot water tank 260 via suitable non-return valves 275NRV; 260NRV to the hot heat exchanger (Hx) 20 for re-heating in order to re-supply the buffer tank 275 as described above at i).

Temperature Transmitters TT and Pressure Transmitters PT are provided as shown in FIG. 5(a) in conjunction with sensors providing data inputs/data outputs as shown in the Legend shown in the right hand side of FIG. 5(a) and/or in dotted lines in FIG. 5(a) in order to either be controlled by or to provide data into the Programmable Logic Controller PLC 350 of FIG. 5(b) such that the PLC 350 controls both the heating/cooling provided for the building 255 and controls the Stirling cycle machine 1*, 1 and 1* and rest of the system components of FIGS. 2(a) and (b), 3(a) and (b) and 4(a) and (b).

In relation to an example of how the PLC 350 can be operated, during e.g. the winter months, the heat transfer fluid in the buffer tank 275 is kept hot by the Stirling cycle machine 1*, 1 and 1* of FIGS. 2(a) and (b), 3(a) and (b) and 4(a) and (b) operating in heat pump mode in order to work as a heater. The hot heat transfer fluid e.g. heated water can be directed towards the respective heater/cooler 300; 295 in either the office 301, or the workshop 296, or both, using respective pumps 302; 297. When domestic hot water at tap 290 is required, it is drawn from the hot water tank 260 and motorised valve 305 diverts the flow of heat transfer fluid through the hot water tank heating coil 270 in order to replenish the hot water in the hot water tank 260.

During the summer months, the heat transfer fluid in the buffer tank 275 is kept cold by the Stirling cycle machine 1*, 1 and 1* of FIGS. 2(a) and (b), 3(a) and (b) and 4(a) and (b) operating in heat pump mode but in cooling mode in order to work as a refrigerator. The cold heat transfer fluid can be directed towards the respective heater/cooler 300; 295 in either the office 301, or workshop 296, or both, using respective pumps 302; 297. When domestic hot water is required at tap 290, it is drawn from the hot water tank 260 and the motorised valve 305 temporarily diverts the flow of heat transfer fluid through the hot water tank heating coil 270 and the phase change device 160 also moves to a different position, causing the Stirling cycle machine 1*, 1 and 1* of FIGS. 2(a) and (b), 3(a) and (b) and 4(a) and (b) operating as a heat pump to heat (instead of cool) the heat transfer fluid whilst the hot water tank 260 is being replenished. When the domestic hot water storage tank 260 is up to temperature, the system reverts to its original state (i.e. with the Stirling cycle machine 1*, 1 and 1* operating in heat pump mode but in cooling mode in order to work as a refrigerator). This system would work well when the demand for domestic hot water (i.e. via the tap 290 for example) is relatively low compared to the requirement for space cooling e.g. an office 301 or workshop 296 environment via the respective heater/cooler 300; 295.

FIG. 5(b) shows the components connected to the cold heat exchanger (CX) 30 of any one of, some of or all of the systems of FIGS. 2(a) and (b), 3(a) and (b) and 4(a) and (b).

The outside heat exchanger 306 is typically located outside of the building 255 and is connected to the cold heat exchanger (CX) 30 via a pump 307, a heat recover heat exchanger 308 and a flowmeter F, and would, most likely, be an air-source heat exchanger but alternatively could be a ground-source heat exchanger.

During the winter months, the heat transfer fluid passing through CX 30 is kept colder than the outside temperature by the Stirling cycle machine 1*, 1 and 1* acting in heat pump mode. Therefore, when the heat transfer fluid is pumped through the external (i.e. outside) heat exchanger 306, it attracts heat from the external environment. In this way, heat energy from outside is transported into the cold heat exchanger (CX) 30. There is also an optional heat recovery (heat exchanger) system 308, that allows waste heat from the Stirling cycle machine 1*, 1 and 1* to be efficiently recycled, if required.

During the summer months, when the Stirling cycle machine 1*, 1 and 1* operating in heat pump mode is operating in cooling mode, heat from inside the building 255 is dumped by the external (outside) heat exchanger 306.

FIG. 5(b) also shows:
  The phase change device 160 (referred to as phaser in FIG. 5(b)), which can be operated to change the phase angle (and therefore output and operating mode) of the Stirling cycle machine 1*, 1 and 1*;
  The crankshaft encoders or angle sensors 126L; 126R, which keep track of the current phase angle of the two halves or portions of the crankshaft 124;
  The crankcase 127 (i.e. the housing for the crankshaft(s) 124), buffer space 13 (the area underneath the pistons 111 and 121) and the working space (i.e. the respective compression and expansion spaces 11, 12) of the pistons 111 and 121 of the Stirling cycle machine 1*, 1 and 1*;
  Thermostat controls, specifically one or more timer thermostats 335 and one or more room thermostats 340 (typically one for each room) which allow the user to input control into the PLC 350 to thereby control the Stirling cycle machine 1*, 1 and 1*;
  The PLC 350, which controls the rest of the system; and
  Temperature transmitters (TT), pressure transmitters (PT) and flow meters (F) that provide inputs to the PLC 350 along with motors M that can be operated by the PLC 350 as required.

The skilled reader should note that, particularly with reference to FIGS. 5(a) to 5(c):
- dotted lines represent data;
- dotted lines into a component indicate a data input; and
- dotted lines out of a component indicate a data output.

A temperature transmitter TT on the buffer tank 275 sends temperature data to the PLC 350. In winter, the target buffer tank 275 temperature will be around 75° C. In summer, the target buffer 275 tank temperature will be around 0° C. Winter mode and summer mode will be selectable via the appropriate thermostat control 335 and/or 340.

Room thermostats 340 allow the user to select required room temperatures at different times and send this information to the PLC 350. If the room thermostat 340 is 'calling for' heat (or cold), the PLC 350 sends a start signal to the heat transfer fluid pumps 285, 297 or 302. Then, as heat is added, or removed, from the building 255, the temperature of the heat transfer fluid in the buffer tank 275 will tend to change. The buffer tank 275 temperature therefore forms parts of a Proportional Integral Derivative (PID) control loop. This allows the PLC 350 to change the phaser or phase change device 160 setpoint which acts as a 'throttle' on the Stirling cycle machine 1*, 1 and 1* (i.e. in heat pump mode) output. Therefore, the PLC 350 works to maintain the buffer tank 275 at a relatively constant temperature by changing the heat pump (i.e. the Stirling cycle machine 1*, 1 and 1*) phase angle. This is a main control function of the PLC 350.

During times of very low demand, the PLC 350 may 'decide' to stop the Stirling cycle machine 1*, 1 and 1* in heat pump mode by interrupting the power supply to the e-motor 130 that drives it.

The PLC 350 also monitors the temperature difference across the external heat exchanger, using two temperature transmitters TT (one either side). By comparing this with the expected value, the PLC 350 can detect freezing of the external heat exchanger (if it is air source). If this occurs, the PLC 350 can temporarily change the phase angle, reversing the flow of heat to defrost the external heat exchanger. It also monitors machine running temperature to allow efficient recycling of waste heat.

For versions that provide active ancillary support services (all versions provide 'passive' support by virtue of being electromagnetically coupled to the supply), the PLC 350 will also include an internet data connection to make it part of a 'smart grid' or 'internet of things'. The PLC 350 data connection can also be used for remote performance monitoring and data logging, if required. For example, it could provide real-time COP data for ongoing development, or participation in government or electricity supplier incentive schemes.

The PLC 350 also coordinates various safety and interlock systems required to allow the Stirling cycle machine 1*, 1 and 1* to operate. For example, it may inhibit starting the main e-motor 130 if the HX 20 and CX 30 heat transfer fluid pumps 285; 307 are not already running, to prevent freezing and boiling inside CX 30 and HX 20, respectively.

Accordingly, the control system has the following advantages:
a) the control system can measure the temperature difference across the outside heat exchanger 306 (such as by measuring the inlet temperature and the outlet temperature of the outside heat exchanger 306) and if there is no difference between the two temperatures then the control system can raise an alarm that the outside heat exchanger isn't working;
b) the control system can measure the inside temperature via eg a room thermostat 340 and the user can increase or decrease the desired temperature if they wish (e.g. in a similar manner to a domestic or commercial room thermostat);
c) the system can also have indoor cooling such as air conditioning with associated sensors;
d) the system can have a data connection to the internet for eg smart grid/grid support ancillary services;
e) the PID (proportional integral derivative) control loop in the control system can sense the temperature of water and has the data input of the set temperature the water has been set to (i.e. from the thermostats) and therefore the PLC 350 can instruct the phase change device 160 to change the phase angle accordingly to pump more heat into the water if needs be and the PID does that in a derivative way so that it doesn't overshoot (i.e. it monitors not only the delta between the two temperatures but also the rate of change and thus slows down the addition of heat as it gets closer to the set point, i.e. as the delta closes); and
f) when using the embodiments of the VFD 132 plus asynchronous motor 133 such as in FIG. 2(b), 3(b) or 4(b), a clutch is not required because the motor 133 is likely to always be directly coupled to the Stirling cycle machine 1*, 1, 1* but such a system is likely to be lower cost and may allow for use of air source heat which is very much lower cost to install than ground source heat.

Detailed Description of Ancilliary Services for an Electricity Distribution Grid In accordance with a further aspect of the invention there is provided one or more embodiments of a method of providing ancillary service(s) to an electricity distribution grid 2, the method comprising the steps of providing one or more ancillary service support systems in accordance with any one, more than one system or more than one combination of systems as disclosed in FIGS. 2(a) and (b), 3(a) and (b) and to 4(a) and (b), in conjunction with the control system as shown in FIGS. 5(a), 5(b) and 5(c) and operatively connecting said support system or systems to the grid 2.

In some preferred embodiments, the ancillary service support systems in accordance with the present invention may operate as part of a smart grid via the internet, where one or more and more preferably a plurality of the ancillary service support systems are electronically controlled from one or more centralised location(s) (not shown) which can control each individual ancillary service support system in isolation and/or can control a plurality of said ancillary service support systems simultaneously. This is likely to provide great stability and flexibility to an operator of an electricity distribution grid 2, particularly in embodiments where a plurality such as hundreds or thousands of such ancillary service support systems are aggregated around the electricity distribution grid 2 in a relatively widely distributed manner.

Optionally, the method further comprises the step of remotely activating the support system.

In accordance with a further aspect of the invention there is provided one or more embodiments of an electricity distribution grid 2 comprising an ancillary service support system in accordance with any one, more than one system or more than one combination of systems as disclosed in FIGS.

2(*a*) and (*b*), 3(*a*) and (*b*) and 4(*a*) and (*b*), in conjunction with the control system as shown in FIGS. 5(*a*), 5(*b*) and 5(*c*).

With the decommissioning of large fossil-fuelled power plants the rotational inertia available to electricity grids 2 will be largely reduced. On the other hand, the increase in renewable energy sources, like solar and wind, will mean an increase in the uptake of electric converters which do not provide any inertia. Taken in combination, these two factors reduce the stability of the grid 2.

Embodiments of electricity distribution grid 2 ancillary service support systems in accordance with the invention as described above and shown by way of examples in the FIGS. 2(*a*) and (*b*), 3(*a*) and (*b*) and 4(*a*) and (*b*), in conjunction with the control system as shown in FIGS. 5(*a*), 5(*b*) and 5(*c*) advantageously provide rotating inertia to the mains electricity grid 2, which assists stabilising the frequency of the grid 2. Provision of such rotating inertia slows down the frequency change by depleting the stored energy, and gives generators time to come online to compensate.

In sufficient numbers such as hundreds, thousands or even more such as ten thousand plus of such systems, widely distributed and/or aggregated throughout an electricity grid network 2 (for example, distributed throughout the United Kingdom national grid network 2), systems in accordance with the present invention will not only mitigate the anticipated loss in rotating inertia, but will exceed the present amount, thus stabilising the grid 2. A further advantage is that the equally distributable nature of the systems which enables grid inertia to be located closer to where it is needed and helps prevents phase shifts in the grid 2 (Islanding). This is particularly the case where at least one flywheel 150 or other rotating mass is coupled between the clutch 140 and the synchronous machine 130 of the present systems. Furthermore, the grid 2 to which the systems in accordance with the invention are connected can draw upon the thermal energy of the systems when in order to supplement the grid 2 power when required, and said thermal energy is preferably the stored thermal energy within the hot 22 or cold 32 store and/or relevant heat sources and heat sinks 21, 31 and/or the Cx 30 and Hx reservoir 20 associated with the respective Stirling cycle machine 1*, 1* and 1** of FIGS. 2(*a*) and (*b*), 3(*a*) and (*b*) and 4(*a*) and (*b*) respectively. Additionally or alternatively, direct firing of each said Stirling cycle machine 1*, 1* and 1** with fuel such as hydrocarbon based fuel such as gas, oil or other suitable fuel could also be used as a back-up energy source, particularly for emergency or black start situations.

The skilled person will also realise that many different versions of systems in accordance with the present invention can be provided, depending upon budget, space available and complexity of the building 255 amongst other factors:

Relatively Simple Version

For example, a relatively simple version does not form part of a smart grid and/or is not connected to the internet but rather uses the phase change device 160 (e.g. epicyclic gear or hydraulic phaser) to vary the thermal output and COP (and doesn't use a VFD but instead uses a clutch 140). For that reason, and particularly if the motor 130 is an asynchronous machine e.g. an induction motor 130, the induction motor 130 would remain coupled to the supply grid network 2 and therefore contribute to inertial response and load reduction. For example, if the supply frequency of the national grid 2 were to fall, the rotating magnetic field in the stator windings of the induction motor 130 would slow down thus reducing slip, and therefore reduce the load on the supply. Whilst it is a 'dumb' system (i.e. not part of a 'smart grid'), it still possesses a stabilising response that occurs 'naturally' and it therefore wouldn't add extra problems to the network (unlike embodiments that incorporate a VFD 132 such as those of FIGS. 2(*b*), 3(*b*) and 4(*b*)). The relatively simple version hereinbefore described could however, via its control system (e.g. as shown in FIGS. 5(*a*), (*b*) and (*c*)) monitor the room and heating medium temperature and modulate its thermal output to suit and it would also be able to make decisions that optimise efficiency vs comfort. For example, it may prioritise thermal output if the building 255 is cold first thing in the morning. Or it may choose to shut down for a while if it's mild outside (particularly if that would be more efficient than running continuously at low output). Alternatively, it may 'decide' to go into reverse, for a short period, if it detects icing of the external heat exchanger 306. Alternatively, it may also go into reverse for long periods, if the room 295; 300 temperature becomes high enough to need cooling. Overall though, in relation to this relatively simple version, the skilled person will realise that it would basically be 'selfish' in that it would not interact with the outside world as such.

In addition, if the simple complexity version is "only" used for space heating, then it is likely to be configured as "only" to operate in heat pump mode (and not engine mode) in that it can operate in 2 heat pump modes (namely heating heat pump mode in winter and cooling heat pump mode in summer) because the heating medium temperature required for space heating is unlikely to be hot enough to act as a heat source for a Stirling cycle machine 1*, 1* or 1** in engine mode.

Medium Complexity Version

However, a medium-complexity version could be a heat pump (e.g. a Stirling cycle machine 1*, 1* or 1) embedded in a 'smart grid' configuration, typically connected to the internet. This would entail, in addition to monitoring room 285; 300 and heating medium temperature, it would also communicate with the electricity network grid 2 (hence the use of the term 'smart grid') to assist in balancing supply and demand over short timescales (e.g. if wind speed temporarily drops or the sun goes behind clouds). Its control system would therefore aim to satisfy building 255 comfort requirements, whilst also supporting electricity network 2 requirements. It would do this by taking part in demand side response (reducing demand at times when supply is limited) and it would be particularly advantageous to do this whilst also supporting the grid network 2 (e.g. via inertia response) rather than simply disconnecting or reducing demand using power electronics such as with a VFD 132** and therefore embodiments that don't incorporate a VFD such as those of FIGS. 2(*a*), 3(*a*) and 4(*a*) are preferred to those embodiments that do incorporate a VFD 132 such as those of FIGS. 2(*b*), 3(*b*) and 4(*b*)).

It will also be noted by the skilled person that if the Stirling cycle machine 1*, 1*, 1 is powered by a synchronous motor 130, rather than the more common asynchronous (induction) motor 133**, it could take part in more complex ancillary services, by acting as a synchronous compensator, or even a generator as hereinbefore described.

Most Complex Version

The most complex version would also be able to run 'backwards', exporting electrical power on demand using stored heat as an energy source. In this case, it is likely the Stirling cycle machine 1*, 1, 1* would operate at higher temperature. This version might be most attractive in an industrial application that requires high temperature heat such as an industrial setting which supplies high temperature process heat (say, for example, where the Stirling cycle machine 1*, 1, 1* can be used in heat pump mode to increase the temperature of a waste heat stream to manufacture steam). It would, most likely, be powered by a synchronous motor 130.

Finally, as described above in relation to the embodiments of FIGS. 2(b), 3(b) and 4(b), it is possible to combine the phase change device 160 with a variable frequency drive 132. The combination of VFD and phase change device 160 would be even more efficient than machines that rely on either system working alone. However, in this case, the ancillary services benefits to the electricity grid network 2 would be lost because it uses a VFD 132.

Summary of the Advantages Afforded by use of the Phase Change Device 160

Compared to for example the system shown in either of FIG. 1(a) or 1(b) which could control the heat pump (i.e. Stirling cycle machine 1) using a variable frequency drive, the mechanical phase change device 160 that is used in preferred embodiments shown in FIGS. 2(a) and (b), 3(a) and (b) and 4(a) and (b)—and particularly those of FIGS. 2(a), 3(a) and 4(a)-provides the following advantages:

the mechanical phase change device 160 allows the power output (and COP) to be varied, achieving similar results to a VFD 132, but without the disadvantages and it 160 also does not have a detrimental impact on the electricity grid network 2 but rather it provides potentially very useful ancillary support services as hereinbefore described;

the mechanical phase change device 160 allows the heat pump (i.e. the Stirling cycle machine 1*, 1, 1*) to run as a generator, exporting electrical power, using stored thermal energy as an energy source (which a VFD-driven heat pump cannot do);

the asynchronous or synchronous motor 130 can keep on rotating (i.e. it doesn't need to be stopped from rotating) and indeed can be kept rotating in the same direction even though the Stirling cycle machine 1*, 1, 1* may transform between heat pump mode and generation mode and vice versa; and the mechanical phase change device 160 can be used (i.e. in the embodiments shown in FIGS. 2(b), 3(b) and 4(b)) in conjunction with a VFD 132 to further increase the efficiency of a Stirling cycle machine when used in heat pump mode. However, in this case, it also suffers from the same disadvantages as the system described in FIG. 1(b) (because it also uses a VFD 132). Nonetheless, it may be preferred in some applications where flexibility and efficiency are the highest priority.

Modifications and improvements can be made to the embodiments hereinbefore described without departing from the scope of the invention.

The invention claimed is:

1. An electrically connectable heat pump system comprising:
(1) a regenerative thermal machine comprising:
working fluid compression spaces and working fluid expansion spaces;
a phase change device for changing the phase relationship between the said working fluid compression and expansion spaces; and
a drive mechanism comprising a rotatable input/output drive end; and
(2) an electrical machine that is electrically connectable to an electricity distribution grid, the electrical machine comprising a rotatable rotor which is mechanically connectable to the rotatable input/output drive end such that the rotatable rotor and the input/output drive end rotate when mechanically connected together;
wherein the phase change device changes the operation of the regenerative thermal machine between a heat pump mode in which the input/output drive end is driven by the rotatable rotor, and an engine mode in which the input/output drive end drives the rotatable rotor to generate electricity, and vice versa;
wherein the direction of rotation of the input/output drive end and the rotatable rotor is maintained as the phase change device changes from the heat pump mode to the heat engine mode and vice versa; and
wherein the electrical machine is interchangeable between receiving electrical power in the heat pump mode and producing electrical power in the engine mode.

2. A heat pump system as claimed in claim 1, wherein the electrical machine is a synchronous motor and is permanently connected to the electricity grid.

3. A heat pump system as claimed in claim 1, wherein the electrical machine is an asynchronous motor and is connected to the electricity grid via a variable frequency drive device.

4. A heat pump system as claimed in claim 1, wherein the regenerative thermal machine comprises at least one drive mechanism to vary the volume of the said compression and expansion spaces with respect to one another.

5. A heat pump system as claimed in claim 4, wherein the phase change device is a phase change gearbox which mechanically couples one portion of the drive mechanism to another portion of the drive mechanism, wherein the phase change transmission changes the relative angle between the two portions of the drive mechanism and thereby the phase relationship between the compression and expansion spaces.

6. A heat pump system according to claim 4, wherein the phase change device comprises two drive mechanisms, one drive mechanism being provided for each of the compression and expansion spaces, and a respective electrical machine coupled to each separate drive mechanism for driving a change of volume for each of the compression and the expansion spaces, wherein each respective electrical machine is operable to control the phase angle between each said separate drive mechanism.

7. A heat pump system as claimed in claim 1, wherein the phase change device comprises any one or more of:—
a stepper motor,
a brake mechanism,
an electrically actuated mechanism,
a mechanically actuated mechanisms,
a hydraulically actuated mechanisms and
a pneumatically actuated mechanism.

8. A heat pump system as claimed in claim 1, wherein the heat pump system comprises a first heat exchanger and a second heat exchanger, wherein one heat exchanger is a hot side heat exchanger (Hx) in use and one heat exchanger is a cold side heat exchanger (Cx) in use and wherein the respective heat exchangers are in fluid communication with a respective compression and expansion space of the regenerative thermal machine.

9. A heat pump system as claimed in claim 8, wherein the regenerative thermal machine is in fluid communication with at least two heat reservoirs, and wherein at least one heat reservoir is in fluid communication with the hot side heat exchanger (Hx) and at least one heat reservoir is in fluid communication with the cold side heat exchanger (Cx).

10. A heat pump system as claimed in claim 8, wherein the heat pump system further comprises a recuperator intermediate and in fluid communication with the hot side heat exchanger (Hx) and the cold side heat exchanger (Cx).

11. A heat pump system as claimed in claim 8, wherein the heat pump system comprises a hot store intermediate the hot side heat exchanger (Hx) and a heat reservoir.

12. A heat pump system as claimed in claim 1, wherein the heat pump system further comprises an internal heat exchanger (regenerator (Rx).

13. A heat pump system as claimed in claim 1, wherein the regenerative thermal machine is a Stirling cycle machine.

14. A heat pump system as claimed in claim 1, further comprising a controller for controlling at least part of the heat pump system.

15. A heat pump system as claimed in claim 14, wherein the receives one or more input signals from said one or more inputs and outputs one or more signals to control one or more components of the heat pump system.

16. A heat pump system as claimed in claim 14, wherein the controller controls the operation of the phase change device.

17. A heat pump system as claimed in claim 14, wherein the controller comprises an electronic control system, which permits the heat pump system to be tuned to one of:—
  i) the point of maximum efficiency,
  ii) the point of maximum thermal output, and
  iii) a point in between i) and ii).

18. A heat pump system as claimed in claim 17, wherein the electronic control system provides a feedback electronic control system to control the regenerative thermal machine and enable the regenerative thermal machine to interact with the electricity distribution grid.

19. A heat pump system as claimed in claim 18, wherein the feedback electronic control system enables the heat pump system to provide ancillary services to the electricity distribution grid including one or more of:—
  a) Firm Frequency Response (FFR);
  b) Frequency Control by Demand Management (FCDM);
  c) Short Term Operating Reserve (STOR);
  d) Inertia;
  e) Reactive power; and
  f) Black Start.

20. A method of providing ancillary services to an electricity distribution grid, the method comprising the steps of providing one or more heat pump system(s) as claimed in claim 1 and operatively connecting said one or more heat pump system(s) to the electricity distribution grid.

21. A method of providing ancillary services to an electricity distribution grid as claimed in claim 20, the method comprising providing a plurality of heat pump systems and distributing said plurality of heat pump systems around the electricity distribution grid in an aggregated distribution.

22. A method of providing ancillary services to an electricity distribution grid as claimed in claim 20, the method further comprising the step of remotely activating the or each heat pump system(s).

23. A method of providing ancillary services to an electricity distribution grid as claimed in claim 20, wherein the heat pump systems operate as part of a smart grid, wherein one or more of the heat pump systems are electronically controlled from one or more centralised location(s) which can control each individual heat pump system.

24. A method of providing ancillary services to an electricity distribution grid as claimed in claim 20, wherein the method further comprises, in the event of a black out of at least a part of the electricity distribution grid, actuating one or more of the heat pump systems to change the operation of each said respective heat pump system into its respective engine mode and engaging the respective clutch (if it is not already engaged) of each heat pump system to drive the respective electrical machine of each heat pump system to provide a black start to the grid.

25. An electricity distribution grid comprising at least one or more heat pump systems as claimed in claim 1.

26. An electrically connectable heat pump system according to claim 1, wherein the phase change device can also change the operation of the regenerative thermal machine between a heating heat pump mode and a cooling heat pump mode.

27. An electrically connectable heat pump system according to claim 26, wherein the phase change device can also change the operation of the regenerative thermal machine between said heating and cooling heat pump modes seamlessly, without having to reverse the direction of rotation of the input/output drive end of the regenerative thermal machine.

28. An electrically connectable heat pump system according to claim 1, wherein the electrical machine is interchangeable between receiving electrical power from the electricity distribution grid in the heat pump mode and producing electrical power into the electricity distribution grid in the engine mode.

29. A method of operating an electrically connectable heat pump system, comprising:—
  providing a heat pump system comprising a regenerative thermal machine in fluid communication with one or more heat reservoirs, the regenerative thermal machine further comprising working fluid compression and expansion spaces and a phase change device operable to change the phase relationship between the said working fluid compression and expansion spaces of the regenerative thermal machine;
  the regenerative thermal machine further comprising a drive mechanism comprising a rotatable input/output drive end;
  further providing an electrical machine having a rotatable rotor and electrically connecting said electrical machine to an electricity distribution grid,
  mechanically connecting the rotatable input/output drive end of the drive mechanism of the regenerative thermal machine to the rotatable rotor of the electrical machine, such that the rotatable rotor and the input/output drive end rotate as one unit;
  and configuring said electrical machine to interchangeably operate as a motor in which it receives electrical motive power from the electricity grid in order to drive the regenerative thermal machine in the heat pump mode, and operate as a regenerative thermal machine-driven generator to produce and feed electrical power into said electricity grid; and
  operating the phase change device to change the phase relationship between the said working fluid compression and expansion spaces of the regenerative thermal machine; and
  further operating the phase change device to change the operation of the regenerative thermal machine seamlessly between a heat pump mode in which the input/output drive end of the regenerative thermal machine is rotatably driven by the rotor of the electrical machine, and an engine mode in which the input/output drive end of the regenerative thermal machine rotatably drives the rotor of the electrical machine to generate electricity, and vice versa, wherein the direction of rotation of the input/output drive end of the drive mechanism and the rotor of the electrical machine are maintained as the regenerative thermal machine changes mode from heat pump to heat engine and vice versa.

30. A method of operating an electrically connectable heat pump system according to claim 29, further comprising operating the phase change device to change the operation of the regenerative thermal machine between a heating heat pump mode and a cooling heat pump mode.

31. A method of operating an electrically connectable heat pump system according to claim 30, further comprising operating the phase change device to change the operation of the regenerative thermal machine between said heating and cooling heat pump modes seamlessly, without having to reverse the direction of rotation of the input/output drive end of the regenerative thermal machine.

\* \* \* \* \*

UNITED STATES PATENT AND TRADEMARK OFFICE
CERTIFICATE OF CORRECTION

| | | |
|---|---|---|
| PATENT NO. | : 12,278,546 B2 | Page 1 of 1 |
| APPLICATION NO. | : 18/577930 | |
| DATED | : April 15, 2025 | |
| INVENTOR(S) | : Kenneth Whittaker, Keith Graham Watt and Matthias Graessner | |

It is certified that error appears in the above-identified patent and that said Letters Patent is hereby corrected as shown below:

On the Title Page

Item (71) WHITTAKER ENGINEERING (STONE-HAVEN) LIMITED, Aberdeenshire (GB)"
should read --WHITTAKER ENGINEERING (STONEHAVEN) LIMITED, Aberdeenshire (GB)--.

Signed and Sealed this
Twenty-fourth Day of June, 2025

Coke Morgan Stewart
*Acting Director of the United States Patent and Trademark Office*